United States Patent
Sengoku et al.

(10) Patent No.: US 9,552,325 B2
(45) Date of Patent: Jan. 24, 2017

(54) CAMERA CONTROL INTERFACE EXTENSION BUS

(71) Applicant: QUALCOMM Incorporated, San Diego, CA (US)

(72) Inventors: Shoichiro Sengoku, San Diego, CA (US); George Alan Wiley, San Diego, CA (US); Joseph Cheung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 14/302,362

(22) Filed: Jun. 11, 2014

(65) Prior Publication Data

US 2014/0372643 A1 Dec. 18, 2014

Related U.S. Application Data

(60) Provisional application No. 61/834,151, filed on Jun. 12, 2013, provisional application No. 61/836,777, (Continued)

(51) Int. Cl.
G06F 13/42 (2006.01)
G06F 13/364 (2006.01)
H04L 7/033 (2006.01)

(52) U.S. Cl.
CPC ......... *G06F 13/4291* (2013.01); *G06F 13/364* (2013.01); *G06F 13/4282* (2013.01); *G06F 13/4295* (2013.01); *H04L 7/0331* (2013.01)

(58) Field of Classification Search
CPC .............. G06F 13/4291; G06F 13/4282; G06F 13/4295; H04L 7/0331; H04L 7/0334
See application file for complete search history.

(56) References Cited

U.S. PATENT DOCUMENTS 3,750,021 A 7/1973 Lender
6,181,709 B1 1/2001 Helbig et al.
(Continued)

FOREIGN PATENT DOCUMENTS

EP 1061453 A1 12/2000

OTHER PUBLICATIONS

Kushawa, Mamita and Kapse, Vinod; "A New Subset I2C Protocol for Interfacing Camera Module With Baseband Processor"; International Journal of Advancement in Research & Technology; vol. 1, Issue 7, Dec. 2012.*

(Continued)

*Primary Examiner* — Glenn A Auve
(74) *Attorney, Agent, or Firm* — Loza & Loza, LLP

(57) ABSTRACT

System, methods and apparatus are described that offer improved performance of a serial bus used for Inter-Integrated Circuit (I2C) and/or camera control interface (CCI) operations. CCI extension (CCIe) devices are described. CCIe devices may be configured as a bus master or as a slave. In one method, a CCIe transmitter may generate a transition number from a set of bits, convert the transition number into a sequence of symbols, and transmit the sequence of symbols in the signaling state of a two-wire serial bus. Timing information may be encoded in the transitions between symbols of consecutive pairs of symbols in the sequence of symbols. For example, each transition may cause a change in the signaling state of at least one wire of the two-wire serial bus. A CCIe receiver may derive a receive clock from the transitions in order to receive and decode the sequence of symbols.

30 Claims, 26 Drawing Sheets

Related U.S. Application Data filed on Jun. 19, 2013, provisional application No. 61/886,002, filed on Oct. 2, 2013.

(56) References Cited

U.S. PATENT DOCUMENTS

| | | |
|---|---|---|
| 6,574,233 B1 | 6/2003 | Fuller, Jr. et al. |
| 2001/0047491 A1 | 11/2001 | Indefrey et al. |
| 2004/0165725 A1 | 8/2004 | Kumar et al. |
| 2008/0310281 A1 | 12/2008 | Hara et al. |
| 2010/0113093 A1 | 5/2010 | Hsu et al. |
| 2011/0194595 A1 | 8/2011 | Shetty |
| 2014/0013017 A1 | 1/2014 | Decesaris et al. |
| 2014/0372642 A1* | 12/2014 | Sengoku ............. G06F 13/4291 710/105 |
| 2014/0372644 A1 | 12/2014 | Sengoku et al. |

OTHER PUBLICATIONS

The I2C-Bus Specification, Version 2.1, Philips Semiconductors, Jan. 2000.*
IEEE Standard for a High Performance Serial Bus, Dec. 12, 1995, XP055139744, pp. 1-45, Retrieved from the Internet: URL:http://standards.ieee.org/findstds/standard/1394-1995.html.
International Search Report and Written Opinion—PCT/US2014/042188—ISA/EPO—Sep. 18, 2014.

* cited by examiner

CAMERA CONTROL INTERFACE EXTENSION BUS

CROSS-REFERENCE TO RELATED APPLICATIONS

The present Application for patent claims priority to Provisional Application No. 61/834,151 entitled "Increasing Data Transfer Rate Over I2C Bus" filed Jun. 12, 2013, to Provisional Application No. 61/836,777 entitled "Camera Control Interface Extension Bus" filed Jun. 19, 2013, and to Provisional Application No. 61/886,002 entitled "Simplifying Symbol Transcoding And Transmission Over CCIe Bus" filed Oct. 2, 2013, which applications are all assigned to the assignee hereof and hereby expressly incorporated by reference herein.

BACKGROUND

Field

The present disclosure relates generally to an interface between a host processor and a peripheral device such as a camera and, more particularly, to multimode operations in which a clock signal is embedded in symbols transferred on a multi-wire shared bus.

Background

The Inter-Integrated Circuit serial bus, which may also be referred to as the I2C bus or the I$^2$C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors.

Protocols governing I2C bus operations define basic types of messages, each of which begins with a START and ends with a STOP. The I2C bus uses 7-bit addressing and defines two types of nodes: master and slave. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be changed between messages (i.e., after a STOP is sent).

Original implementations of the I2C bus supported data signaling rates of up to 100 kilobits per second (100 kbps) in standard-mode operation, with more recent standards supporting speeds of 400 kbps in fast-mode operation, and 1 megabit per second (Mbps) in fast-mode plus operation. In some systems and apparatus, however, even higher bandwidths are required to support communications between certain types of devices. For example, mobile communications devices, such as cellular phones, may employ multiple devices, such as cameras, displays and various communications interfaces that consume significant bandwidth. Higher bandwidths may be difficult to obtain when conventional I2C protocols are used to maintain compatibility with legacy devices.

There exists an ongoing need for providing optimized communications on serial interfaces configured as a bus connecting master and slave components within a mobile device.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Embodiments disclosed herein provide systems, methods and apparatus that can improve the performance of a communications interface using a serial bus that supports both conventional I2C bus operations and enhanced communications interfaces using a common I2C bus. A camera control interface (CCI) may be deployed using a two-wire, bi-directional, half duplex, serial interface configured as a bus connecting a master and one or more slaves, where the CCI operations are compatible with I2C bus operations. In one example disclosed herein, CCI extension (CCIe) devices may be deployed using the I2C bus to provide a two-wire, bi-directional, half-duplex, serial interface. CCIe devices may be configured as a bus master or as a slave. CCIe devices can be compatible with or coexist with I2C devices on the I2C bus, such that a CCIe device may communicate with one or more other CCIe devices using CCIe protocols and signaling specifications, even when I2C devices are monitoring the I2C bus. One example disclosed herein provides an interface that can handle multiple slaves on the bus, with a single master, when both CCIe and I2C devices deployed on the same bus. In the latter example, two or more CCIe devices may communicate using CCIe protocols, and any communication transaction with an I2C device is conducted using I2C bus protocols.

In one aspect of the disclosure, the disclosure provides a method of data communication operable on a transmitting device. The method includes generating a transition number from a set of bits, converting the transition number into a sequence of symbols, transmitting the sequence of symbols on a two-wire serial bus when the two-wire serial bus is operated in a first mode of operation. Timing information may be encoded in transitions between symbols in the sequence of symbols. Each transition may cause a change in a signaling state of the two-wire serial bus. The sequence of symbols may be ignored by a device configured for communicating on the two-wire serial bus when the two-wire serial bus is operated in a second mode of operation. The sequence of symbols may include 12 symbols.

In another aspect, the transition number includes a multi-digit ternary number. The ternary number may have twelve digits, for example. The transition number may be converted into the sequence of symbols by providing the ternary number to a transcoder. In one example, a most significant digit of the ternary number is provided to the transcoder first, a least significant digit of the ternary number is provided to the transcoder last, and intermediate digits between the most significant digit and the least significant digit are provided to the transcoder in order of decreasing significance. In another example, a most significant digit of the ternary number is provided to the transcoder last. Four signaling states may be defined for the two-wire serial bus. Each digit of the ternary number may select a next symbol to be transmitted on the two-wire serial bus from one of three available symbols. Each of these three available symbols is different from a current symbol being transmitted on the two-wire serial bus Timing information encoded in the sequence of symbols enables a receiver to generate a receive clock from the sequence of symbols.

In another aspect, the two-wire serial bus may be a multi-purpose bus that supports communications using CCIe protocols when the two-wire serial bus is operated in the first mode of operation. The two-wire serial bus may support communications using I2C protocols in the second mode of operation. The sequence of symbols may be transmitted on the two-wire serial bus by providing an I2C start condition between sequences of symbols transmitted on the two-wire serial bus in the first mode of operation. The start condition may cause a reset of receive logic in a device configured for communications using the I2C protocols. The sequence of symbols may be transmitted on the two-wire serial bus after a first I2C start condition is transmitted on the two-wire serial bus. The sequence of symbols may be followed on the two-wire serial bus by a second I2C start condition. An I2C receiver monitoring the two-wire serial bus may perceive a maximum of 6 clock cycles on a SCL of the two-wire serial bus after the first I2C start condition and before the second I2C start condition.

In one aspect of the disclosure, an apparatus includes a bus interface adapted to couple the apparatus to a two-wire serial bus operable to be shared with a plurality of other apparatus and devices, and a processing circuit coupled to the bus interface. The processing circuit may be configured to generate a transition number from a set of bits, convert the transition number into a sequence of symbols, and transmit the sequence of symbols on a two-wire serial bus when the two-wire serial bus is operated in a first mode of operation. Timing information may be encoded in transitions between symbols in the sequence of symbols. Each transition causes a change in a signaling state of the two-wire serial bus. The sequence of symbols may be ignored by a device configured for communicating on the two-wire serial bus when the two-wire serial bus is operated in a second mode of operation.

In one aspect of the disclosure, a method operable on a data communication receiving device includes deriving a receive clock from transitions in signaling state of a two-wire serial bus when the two-wire serial bus is operated in a first mode of operation, using the receive clock to receive a sequence of symbols that is transmitted on the two-wire serial bus in accordance with the first mode of operation, generating a transition number from the sequence of symbols, and decoding data from the transition number. The transitions in signaling state of the two-wire serial bus may correspond to transitions between symbols in the sequence of symbols. The sequence of symbols may be ignored by a device configured for communicating on the two-wire serial bus when the two-wire serial bus is operated in a second mode of operation. The sequence of symbols may include 12 symbols.

In another aspect, the transition number may have multiple digits, with each digit representing a transition between a pair of consecutive symbols in the sequence of symbols. The transition number may include a twelve digit ternary number. Four signaling states may be defined for the two-wire serial bus. Each digit of the ternary number may represent a relationship between a pair of consecutive signaling states on the two-wire serial bus. Each symbol in the sequence of symbols may be one of four symbols defined by the signaling state of the two-wire serial bus. Each digit of the ternary number may define a relationship between a pair of consecutive symbols in the sequence of symbols.

In another aspect, the two-wire serial bus may be a multi-purpose bus that supports CCIe communications when the two-wire serial bus is operated in the first mode of operation. The two-wire serial bus may support I2C communications in the second mode of operation. The sequence of symbols may be received from the two-wire serial bus by determining occurrence of an I2C start condition on the two-wire serial bus, and receiving 12 symbols from the two-wire serial bus according to timing defined by the receive clock.

In one aspect of the disclosure, an apparatus includes a bus interface adapted to couple the apparatus to a two-wire serial bus operable to be shared with a plurality of other devices, a clock recovery circuit configured to derive a receive clock from transitions in signaling state of a two-wire serial bus, and a processing circuit coupled to the bus interface. The processing circuit may be configured to derive a receive clock from transitions in signaling state of the two-wire serial bus when the two-wire serial bus is operated in a first mode of operation, use the receive clock to receive a sequence of symbols that is transmitted on the two-wire serial bus in accordance with the first mode of operation, generate a transition number from the sequence of symbols, and decode data from the transition number. The transitions in signaling state of the two-wire serial bus may correspond to transitions between symbols in the sequence of symbols. The transition number may have multiple digits, with each digit representing a transition between a pair of consecutive symbols in the sequence of symbols. The sequence of symbols may be ignored by a device configured for communicating on the two-wire serial bus when the two-wire serial bus is operated in a second mode of operation.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
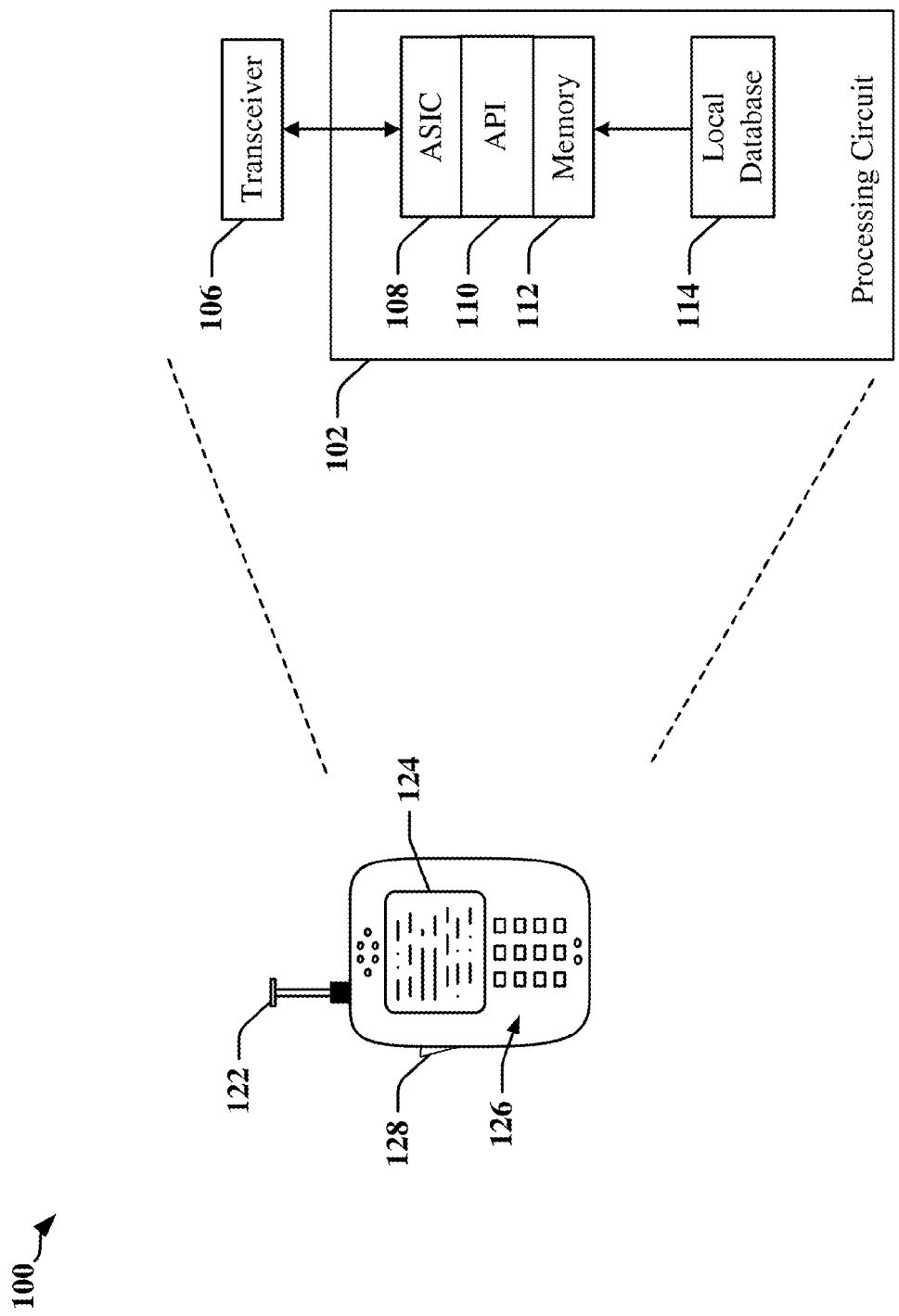
FIG. 1 depicts an apparatus employing a data link between IC devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may have one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as antenna 122, display 124, operator controls, such as button 128 and keypad 126 among other components.

Example of a Bus Architecture that Supports Both I2C and CCIe Operations

Figure 2:
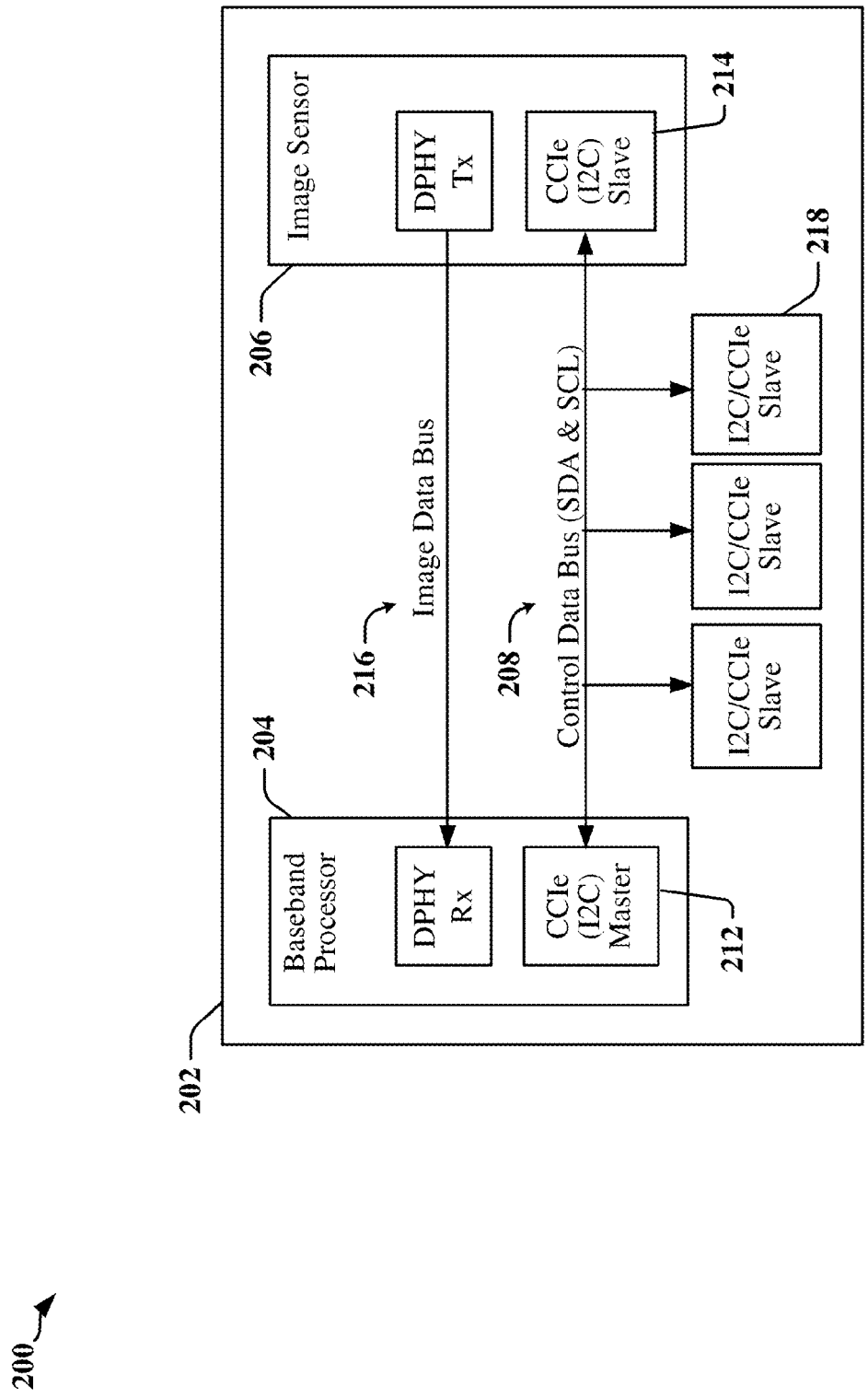
FIG. 2 illustrates a device having a baseband processor and an image sensor and implementing an image data bus and a multi-mode control data bus.

FIG. 2 is a block diagram 200 illustrating a simplified example of a device 202 that has a baseband processor 204 and an image sensor 206. An image data bus 216 and a multi-mode control data bus 208 may be implemented in the device 202. The diagram 200 illustrates a camera device 202 by way of example only, and various other devices and/or different functionalities may implement, operate and/or communicate using the control data bus 208. In the depicted example, image data may be sent from the image sensor 206 to the baseband processor 204 over an image data bus 216, such as the "DPHY" a high-speed differential link defined by MIPI. In one example, the control data bus 208 may have two wires that are configurable for operation in an I2C bus mode. Accordingly, the control data bus 208 may include SCL and SDA wires. The SCL may carry a clock signal that may be used to synchronize data transfers over the control data bus 208 according to I2C protocols. The data line SDA and clock line SCL may be coupled to multiple devices 212, 214, and 218 on the I2C bus (control data bus 208). In the example, control data may be exchanged between the baseband processor 204 and the image sensor 206 as well as other peripheral devices 218 via the control data bus 208. According to I2C protocols, clock speeds on the SCL wire may be up to 100 KHz for normal I2C operation, up to 400 KHz for I2C fast mode, and up to 1 MHz for I2C fast mode plus (Fm+). These operating modes over an I2C bus may be referred to as a camera control interface (CCI) mode when used for camera applications.

According to one aspect, an improved mode of operation may be implemented over the multi-mode control data bus 208 to support camera operation. The improved mode of operation may enable data to be transferred at a rate greater than 1 MHz, and the improved mode may be referred to as a CCI extension (CCIe) mode.

In one example a CCIe bus may be used to provide higher data rates for devices that are compatible with CCIe bus operations. Such devices may be referred to as CCIe devices, and the CCIe devices can attain higher data rates when communicating with each other by encoding data as symbols transmitted using both the SCL line and the SDA line of a conventional CCI bus. CCIe may be used for camera applications. CCIe devices and I2C devices may coexist on the same CCIe bus, such that in a first time interval, data may be transmitted using CCIe encoding and other data may be transmitted in a different time interval according to I2C signaling conventions and protocols.

When the device 202 is configured for CCIe mode, the baseband processor 204 includes a master node 212 and the image sensor 206 includes a slave node 214, with both the master node 212 and slave node 214 operating in accordance with CCIe mode protocols over the control data bus 208 without affecting the proper operation of any legacy I2C devices coupled to the control data bus 208. The control data bus 208 may support CCIe mode operations without a bridge device between CCIe devices and legacy I2C slave devices.

In one example, during a first exchange on the control data bus 208, the legacy I2C devices may operate in a first mode having a first clock, first bus speed, and/or first signal protocol, while during a second exchange on the control data bus 208 CCIe-capable devices may operate in a second mode having a second clock, second bus speed, and/or second protocol. The first clock, first bus speed, and/or first signal protocol may be distinct from the second clock, second bus speed, and/or second protocol. For example, the second clock and/or second bus speed may be faster or have greater speed than the first clock and/or first bus speed, respectively.

In another example, all slave devices 218 may be CCIe-capable devices so that there is no need to switch between the first mode and second mode of operation. That is, all signaling and/or communications over may be performed according to the second mode using the second clock and/or second bus speed, and using the second protocol. There is no need or advantage to switch between the first mode and second mode when all slave devices 218 are CCIe-capable devices because the second mode may provide a greater bit rate than the first mode. In some instances, a third mode of operation may be implemented which provides an even greater bit rate than the second mode but is not compatible with I2C devices when the first mode need not be accommodated.

Figure 3:
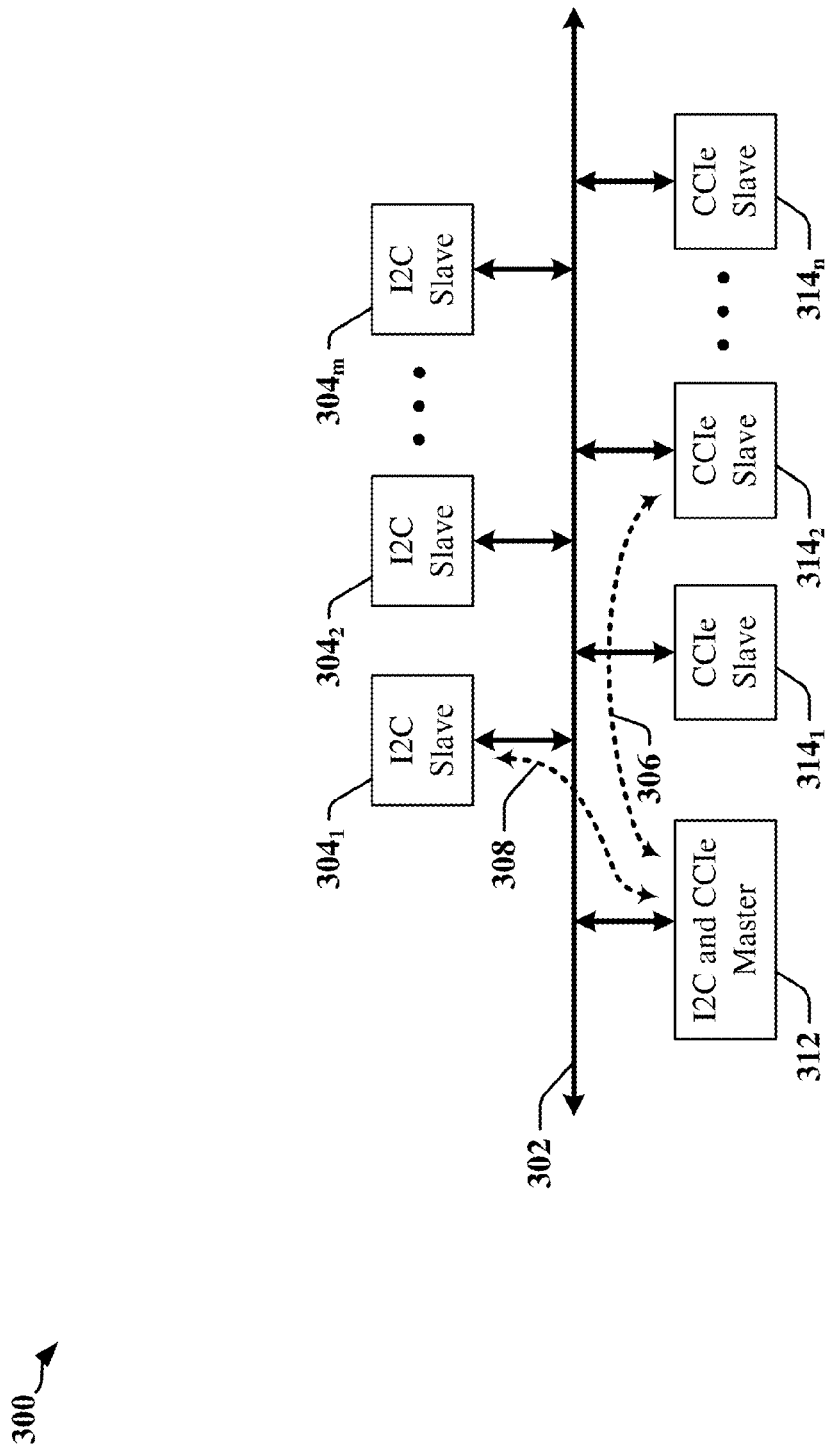
FIG. 3 illustrates a multi-purpose or common serial bus that supports coexisting I2C mode devices and CCIe mode devices.

FIG. 3 is a block diagram illustrating a common bus 302 that supports coexisting I2C mode devices $304_1$-$304_m$ and CCIe mode devices 312, and $314_1$-$314_n$. For I2C mode transactions 308, a CCIe-capable master device 312 may communicate with I2C slave devices $304_1$-$304_m$ on the bus 302 using I2C Fm+ or CCI protocol to obtain a maximum data rate of 1 Mbps. While the CCIe-capable master device 312 may support full CCI or I2C Fm+ capability, a CCIe-capable slave device $314_1$-$314_n$ may not be required to support full I2C capability.

The CCIe-capable master device 312 may also establish CCIe mode communications 306 with CCIe-capable slave devices $314_1$-$314_n$. CCIe mode permits a single master operation and multiple masters are not supported. In CCIe mode, the CCIe master device 312 communicates only with CCIe-capable slave devices $314_1$-$314_n$ on the control data bus 302. The CCIe-capable devices 312, and $314_1$-$314_n$ may communicate at significantly higher data rates in CCIe mode than in I2C modes. For example, CCIe-capable devices 312, and $314_1$-$314_n$ may communicate at data rates of 6.4 Mbps, or 16.7 Mbps.

A default start-up mode may be configured or defined for the bus 302. In one example, the bus 302 may be configured to operate in a CCIe mode of operation after power-on, reset and/or other type of start-up condition. In another example, the bus 302 may be configured to initially operate in legacy I2C mode. A CCIe-capable master device 312 may cause the mode of operation of the bus 302 to switch from I2C mode to CCIe mode through an I2C general call transmitted when, for example, access to CCIe-capable slave device $314_1$-$314_n$ is desired. The CCIe-capable master device 312 may switch from CCIe mode to I2C mode by through a combination of a CCIe "exit" protocol and an I2C general call in order to access I2C slave devices $304_1$-$304_m$ on the bus 302.

Example Illustrating Certain Aspects of a Device Adapted for CCIe Operations

Figure 4:
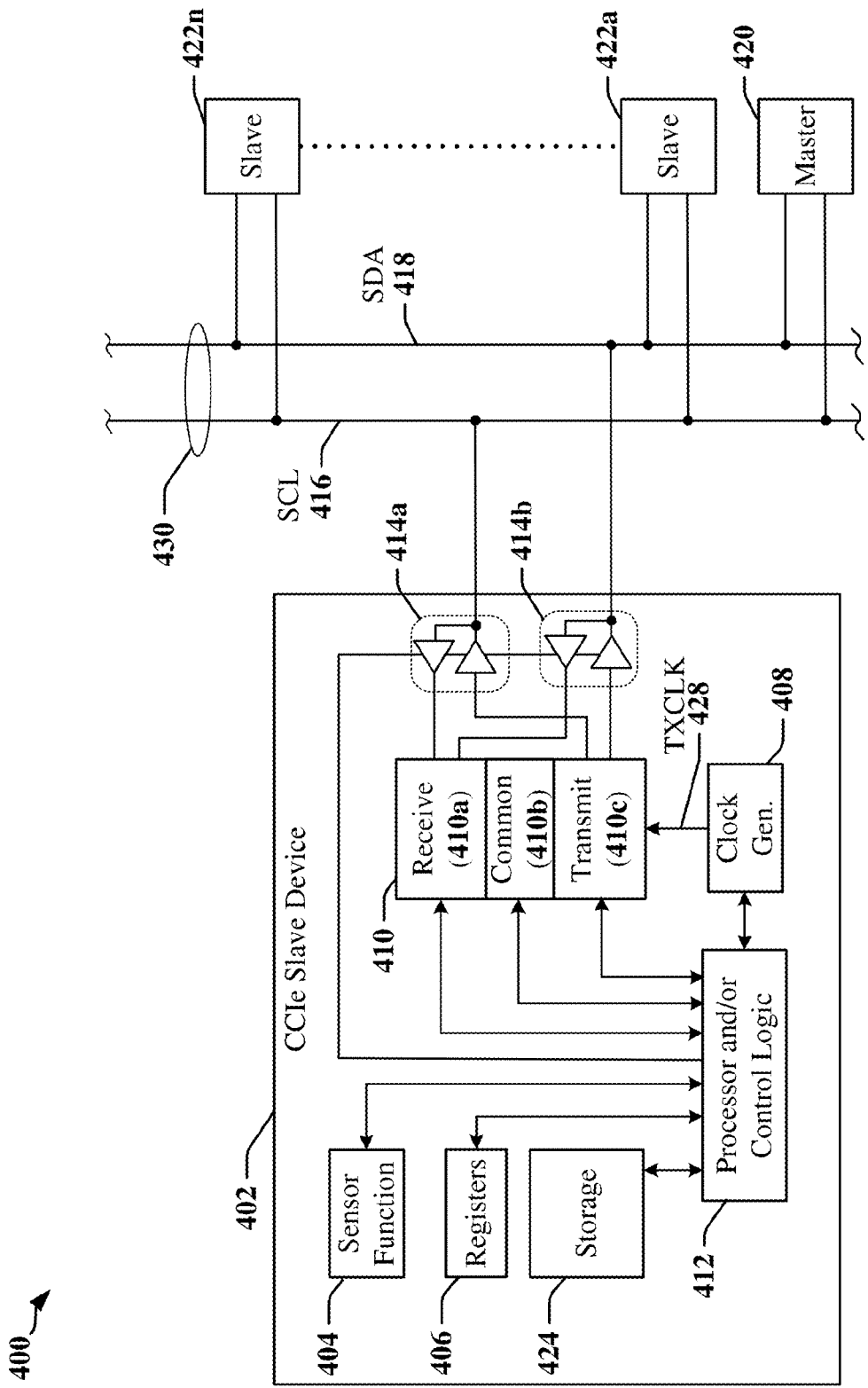
FIG. 4 illustrates a system architecture for an apparatus employing a data link between IC devices.

FIG. 4 is a block schematic diagram illustrating certain aspects of an apparatus 400 that may employ a communications bus such as a CCIe bus 430. The apparatus 400 may be embodied in one or more of a wireless mobile device, a mobile telephone, a mobile computing system, a wireless telephone, a notebook computer, a tablet computing device, a media player, a gaming device, or the like. The apparatus 400 may include multiple devices 402, 420, and/or 422a-422n, which communicate using a CCIe bus 430. The CCIe bus 430 can extend the capabilities of a conventional CCI bus for devices that are configured for enhanced features supported by the CCIe bus 430. For example, the CCIe bus 430 may support a higher bit rate than a CCI bus. According to certain aspects disclosed herein, some versions of the CCIe bus 430 may be configured or adapted to support bit rates of 16.7 Mbps or more, and some versions of the CCIe bus may be configured or adapted to support data rates of at least 23 megabits per second.

In the example illustrated in FIG. 4, an imaging device 402 is configured to operate as a slave device on the CCIe bus 430. The imaging device 402 may be adapted to provide a sensor control function 404 that manages an image sensor, for example. In addition, the imaging device 402 may include configuration registers 406 and/or other storage devices 424, a processing circuit and/or control logic 412, a transceiver 410 and line drivers/receivers 414a and 414b. The processing circuit and/or control logic 412 may include a processor such as a state machine, sequencer, signal processor or general-purpose processor. The transceiver 410 may include a receiver 410a, a transmitter 410c and certain common circuits 410b, including timing, logic and storage circuits and/or devices. In some instances, the transceiver 410 may include encoders and decoders, clock and data recovery circuits, and the like.

A transmit clock (TXCLK) signal 428 may be provided to the transmitter 410c, where the TXCLK signal 428 can be used to determine data transmission rates for a CCIe communication mode. The TXCLK signal 428 may be embedded within sequences of symbols transmitted on the CCIe bus 430, when both the SDA wire 418 and the SCL wire 416 are used to encode transmitted data. In one example, the TXCLK signal 428 may be embedded using transition clock transcoding, whereby data to be transmitted over the physical link 430 is transcoded such that a change of state of at least one wire 416 and/or 418 occurs between each pair of consecutive symbols transmitted on the CCIe bus 430.

Figure 5:
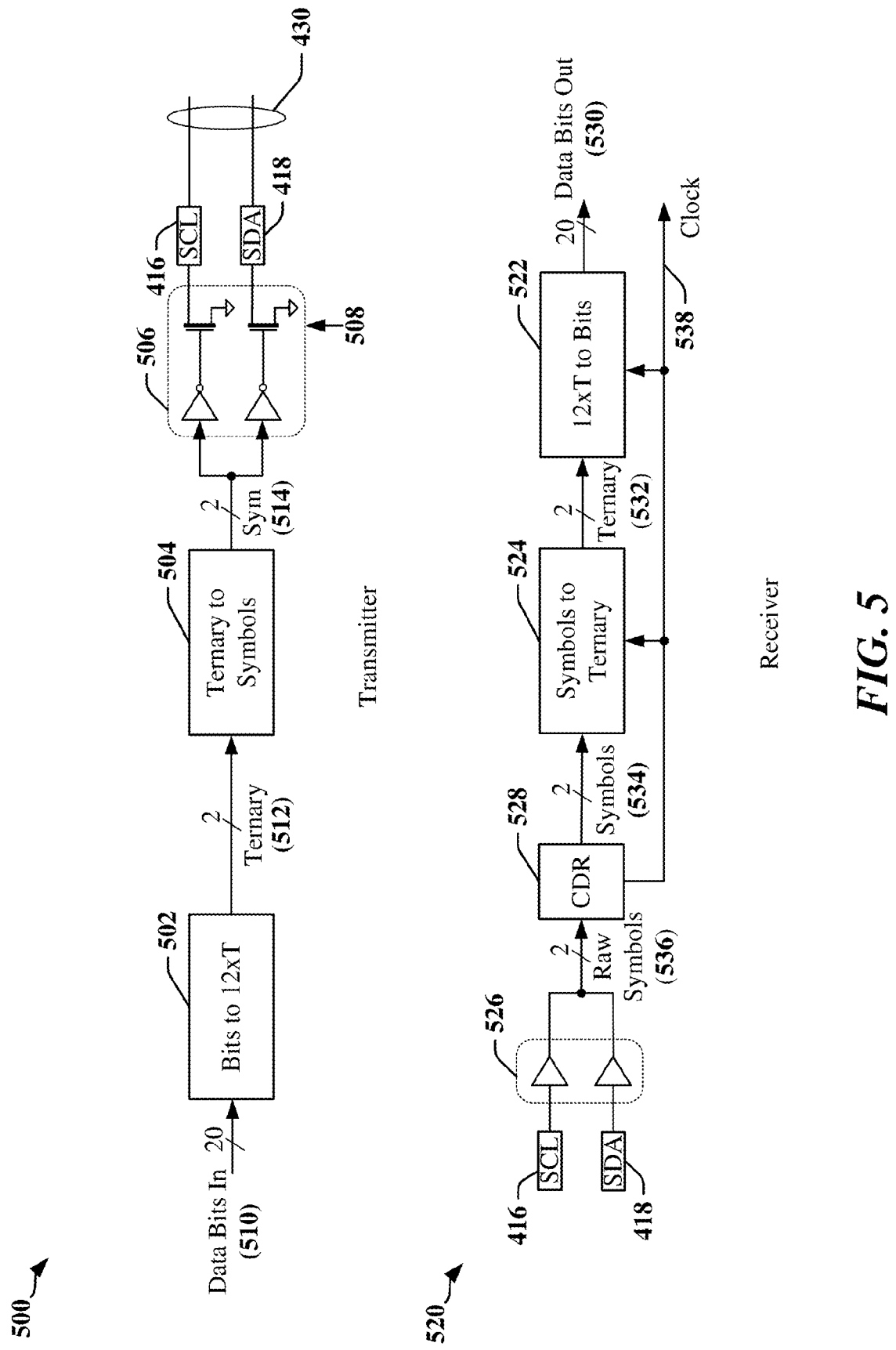
FIG. 5 illustrates certain aspects of a transmitter and a receiver according to certain aspects disclosed herein.

FIG. 5 is a block diagram illustrating an example of a transmitter 500 and a receiver 520 configured according to certain aspects disclosed herein. For CCIe operations, the transmitter 500 may transcode data 510 into ternary (base-3) transition numbers, which are encoded as symbols transmitted on the SCL 416 and SDA 418 signal wires. In the example depicted, each data element (also referred to as a data word) of the input data 510 may have 19 or 20 bits. A converter and/or transcoder 502 may receive the input data 510 and produce a ternary transition number for each data element. Each ternary transition number may be provided as a sequence of 12 ternary digits 512, each ternary digit being represented by two bits. An encoder 504 receives the sequence of 12 ternary digits 512 and produces a stream of 2-bit symbols 514 that are transmitted through line drivers 506. In the example depicted, the line drivers 506 include open-drain output transistors 508. However, in other examples, the line drivers 506 may drive the SCL 416 and SDA 418 signal wires using push-pull drivers. The output stream of 2-bit symbols 514 generated by the encoder 504 has a transition in the state of at least one of the SCL 416 and SDA 418 signal wires between consecutive symbols 514 by ensuring that no pair of consecutive symbols includes two identical symbols. The availability of a transition of state in at least one wire 416 and/or 418 permits a receiving circuit 520 to extract clock information from a received version of the stream of symbols 536 and to derive a receive clock 538 from the stream of data symbols 536.

In a CCIe system, the receiver 520 may include or cooperate with a clock and data recovery (CDR) circuit 528. The receiver 520 may include line interface circuits 526 that provide a stream of raw 2-bit symbols 536 to the CDR circuit 528. The CDR circuit 528 extracts a receive clock 538 from the raw symbols 536 and provides a stream of 2-bit symbols 534 and the receive clock 538 to other circuits 524 and 522 of the receiver 520. In some examples, the CDR circuit 528 may produce multiple clocks 538. In one example, the CDR circuit 528 includes logic that detects transitions on the SCL signal wire 416 and/or on the SDA signal wire 418, and toggles the state of the receive clock 538 upon such detection. The CDR circuit 528 may include time-sensitive circuitry, such as one-shots, delay circuits or other such elements, in order to preclude multiple toggles of the state of the receive clock 538 when transitions on the SCL signal wire 416 and SDA signal wire 418 at the same symbol boundary are delayed with respect to one another. A decoder 524 may use the receive clock 538 to decode the stream of symbols 534 into sequences of 12 ternary digits 532, each sequence 532 representing a transition number.

Each digit of the 12-digit transition number 532 may be represented as a two-bit ternary digit. A transcoder and/or converter 522 may then convert each sequence of 12 ternary digits 532 into 19-bit or 20-bit output data elements 530.

According to certain aspects, conversions between input binary data 510 and a sequence of ternary digits 512 representing a transition number and/or between transition numbers 532 and output data bits 530 are performed by converters 502 and 522. In one example, conversion from data bits 510 to transition numbers at a transmitter 500 and then from transition numbers to data bits 530 at a receiver 520 involves 12 transition symbols for a 2-wire interface 430. The resultant r possible symbol transition states for each transition number T in the set or sequence $\{T_{11}, T_{10}, \ldots, T_2, T_1, T_0\}$ provides a total of $r^{12}$ different states for the 12 transition numbers. For a 2-wire bus, the number of transition states available from each signaling state $r=2^2-1$. Consequently, the sequence of transitions $\{T_{11}, T_{10}, \ldots, T_2, T_1, T_0\}$ can encode data that has $(2^2-1)^{12}=3^{12}=531441$ different states. In this latter example, each transition $T_i$ in the 12-digit ternary number $\{T_{11}, T_{10}, \ldots, T_2, T_1, T_0\}$ is selected from $\{0, 1, 2\}$.

For example, for $\{T11, T10, \ldots T2, T1, T0\} = \{2, 1, 0, 0, 1, 1, 0, 1, 0, 1, 2, 1\}$, the ternary number representing the 12-transition sequences is:

$$2100\_1101\_0121_3 \text{ (Ternary number)} =$$
$$2 \times 3^{11} + 1 \times 3^{10} + 0 \times 3^9 + 0 \times 3^8 + 1 \times 3^7 + 1 \times 3^6 + 0 \times 3^5 +$$
$$1 \times 3^4 + 0 \times 3^3 + 1 \times 3^2 + 2 \times 3^1 + 1 \times 3^0 = 416356 \text{ } (0 \times 65A64).$$

In this manner, 12 ternary digits of a transition number may be converted into a 20-bit data output 530.

In the example of a 2-wire system illustrated in FIG. 5, 12 symbol transition numbers may be generalized to an n-wire system and m symbol transition numbers. When there are r possible symbol transition states for each transition number T in the set or sequence $\{T_{m-1}, T_1, T_0\}$, the m transition sequence can encode $r^m$ different states, where $r=2^n-1$. Consequently, the sequence $\{T_{m-1}, \ldots, T_1, T_0\}$ may encode data that has up to $(2^n-1)^m$ different states.

In one example, a ternary number representative of a symbol transition number 532 in a 2-wire, 12-symbol interface can be converted to a binary number output data bits 530, as follows:

Bits=$T_{11} \times 3^{11} + T_{10} \times 3^{10} + T_9 \times 3^9 + T_8 \times 3^8 + T_7 \times 3^7 + T_6 \times 3^6 + T_5 \times 3^5 + T_4 \times 3^4 + T_3 \times 3^3 + T_2 \times 3^2 + T_1 \times 3 + T_0$.

At the transmitter 500, an algorithm for converting data bits 510 to a ternary number 512 that may be encoded as symbols 514 for transmission on the SCL wire 416 and SDA wire 418 in a 2-wire, 12-symbol interface. The algorithm may iteratively calculate decreasing order transition number ($T_i$) values with their corresponding remainder ($M_i$). That is, each digit can be calculated by dividing the remainder of a modulo operation used in a higher digit calculation with 3 to the power of the digit number, discarding decimal points numbers as follows:

$T_{11}$=Bits/$3^{11}$, $M_{11}$=Bits % $3^{11}$;
$T_{10}$=$M_{11}$/$3^{10}$, $M_{10}$=$M_{11}$%$3^{10}$;
$T_9$=$M_{10}$/$3^9$, $M_9$=$M_{10}$%$3^9$;
$T_8$=$M_9$/$3^8$, $M_8$=$M_9$%$3^8$;
$T_7$=$M_8$/$3^7$, $M_7$=$M_8$%$3^7$;
$T_6$=$M_7$/$3^6$, $M_6$=$M_7$%$3^6$;
$T_5$=$M_6$/$3^5$, $M_5$=$M_6$%$3^5$;

$T_4 = M_5/3^4$, $M_4 = M_5 \% 3^4$;
$T_3 = M_4/3^3$, $M_3 = M_4 \% 3^3$;
$T_2 = M_3/3^2$, $M_2 = M_3 \% 3^2$;
$T_1 = M_2/3$, $M_1 = M_2 \% 3$;
$T_0 = M_1$.

This latter algorithm may be synthesized from the following:

$T_{11} = (\text{Bits} \geq 3^{11} \times 2)?2:(\text{Bits} \geq 3^{11})?1:0$, $M_{11} = \text{Bits} - T_{11} \times 3^{11}$;
$T_{10} = (M_{11} \geq 3^{10} \times 2)?2:(M_{11} \geq 3^{10})?1:0$, $M_{10} = M_{11} - T_{10} \times 3^{10}$;
$T_9 = (M_{10} \geq 3^9 \times 2)?2:(M_{10} \geq 3^9)?1:0$, $M_9 = M_{10} - T_9 \times 3^9$;
$T_8 = (M_9 \geq 3^8 \times 2)?2:(M_9 \geq 3^8)?1:0$, $M_8 = M_9 - T_8 \times 3^8$;
$T_7 = (M_8 \geq 3^7 \times 2)?2:(M_8 \geq 3^7)?1:0$, $M_7 = M_8 - T_7 \times 3^7$;
$T_6 = (M_7 \geq 3^6 \times 2)?2:(M_7 \geq 3^6)?1:0$, $M_6 = M_7 - T_6 \times 3^6$;
$T_5 = (M_6 \geq 3^5 \times 2)?2:(M_6 \geq 3^5)?1:0$, $M_5 = M_6 - T_5 \times 3^5$;
$T_4 = (M_5 \geq 3^4 \times 2)?2:(M_5 \geq 3^4)?1:0$, $M_4 = M_5 - T_4 \times 3^4$;
$T_3 = (M_4 \geq 3^3 \times 2)?2:(M_4 \geq 3^3)?1:0$, $M_3 = M_4 - T_3 \times 3^3$;
$T_2 = (M_3 \geq 3^2 \times 2)?2:(M_3 \geq 3^2)?1:0$, $M_2 = M_3 - T_2 \times 3^2$;
$T_1 = (M_2 \geq 3 \times 2)?2:(M_2 \geq 3)?1:0$, $M_1 = M_2 - T_1 \times 3$;
$T_0 = M_1$.

Figure 6:
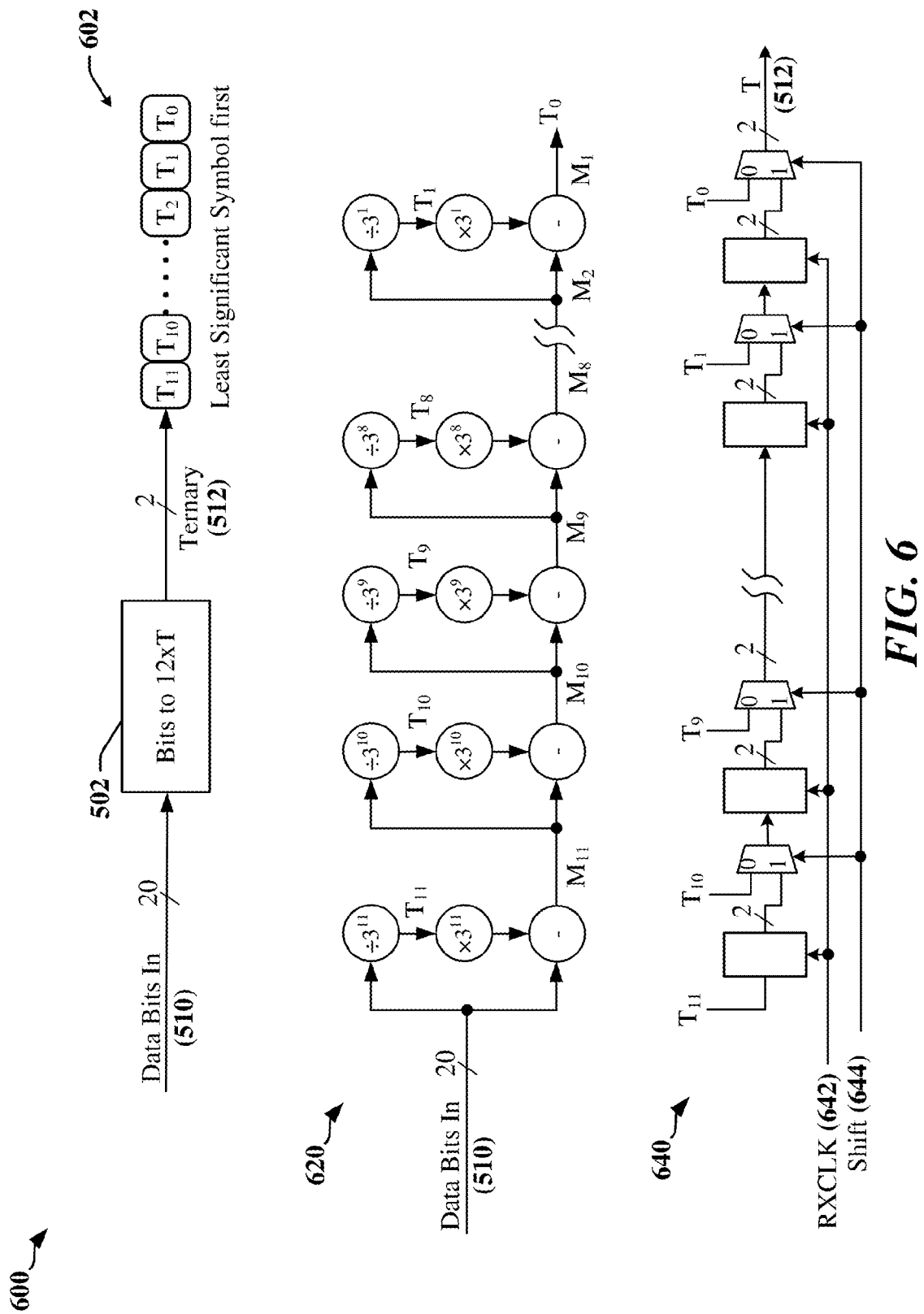
FIG. 6 illustrates logic configured to convert binary bits into ternary numbers when the least significant symbol in a stream of symbols is transmitted first.

FIG. 6 illustrates example logic 620 and 640 for converting binary input data bits 510 into ternary transition numbers 512 when the least significant symbol in a stream of symbols is transmitted first. The logic 620, 640 may be implemented in a converter 502. As shown in the simplified block diagram 600, each ternary transition number 512 produced by the converter 502 may be derived from a number of bits in the input data bits 510, and each ternary transition number 512 may include 12 digits ($T_0, T_1 \ldots T_{11}$) 602. The ternary numbers 512 are subsequently transcoded into symbols 514 that are transmitted to a receiving device 520. For a 12 digit ternary transition number, with $T_0, T_1 \ldots T_{11}$ representing the number, $T_0$ represents the $3°$ digit and is the least significant digit, while $T_{11}$ represents the $3^{11}$ digit and is the most significant digit. As discussed in relation to FIG. 5, these ternary transition numbers 512 are embedded with a clock and encoded into subsequent symbols 514 that are transmitted to the receiving device 520. The logic diagram 620 and logic circuit 640 convert the input data bits 510 into a stream of "least significant symbol first" ternary transition numbers 512.

Figure 7:
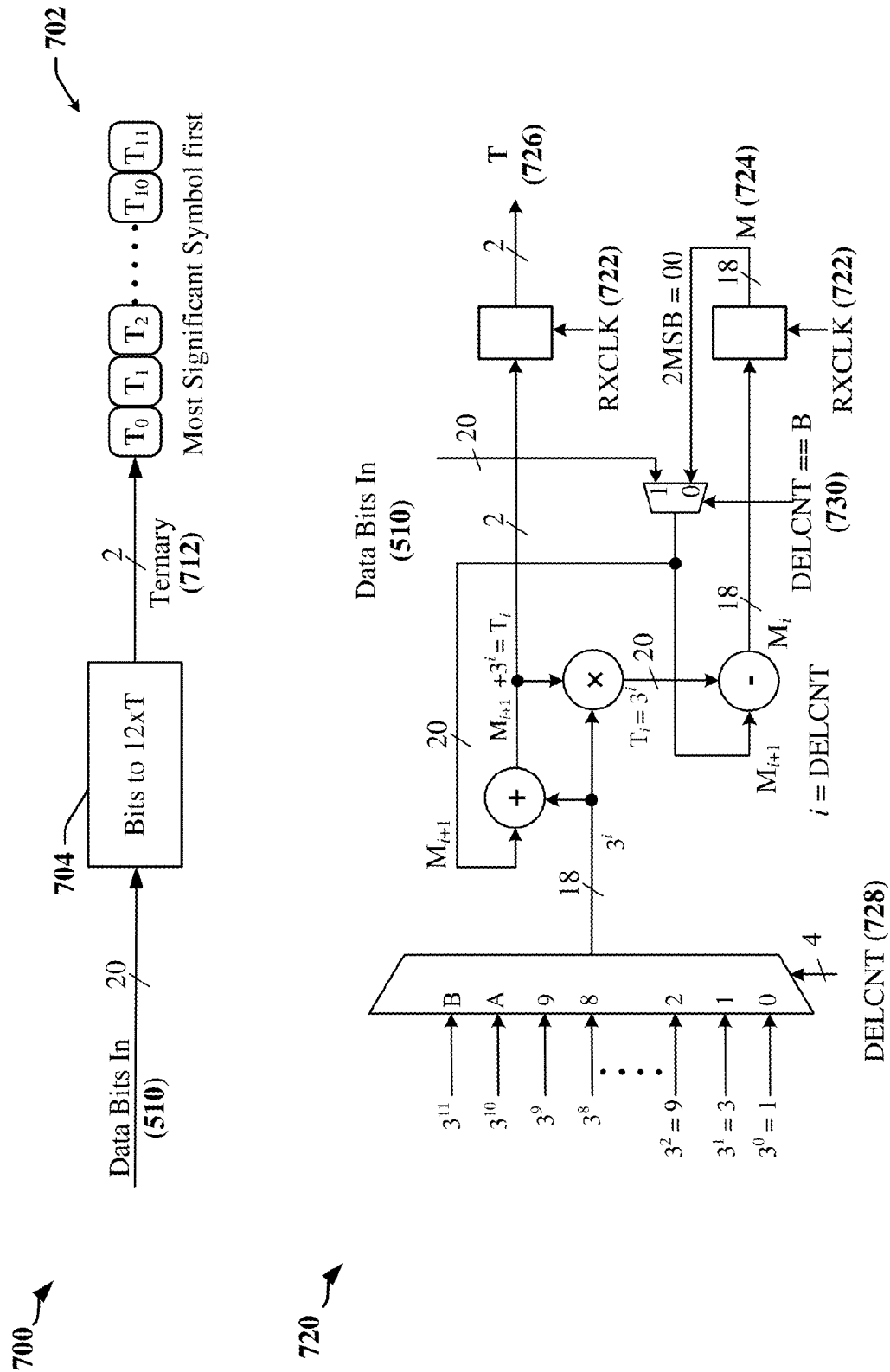
FIG. 7 illustrates logic configured to convert binary bits into ternary numbers when the most significant symbol in a stream of symbols is transmitted first.

FIG. 7 illustrates logic 720 for converting binary input data bits 510 into ternary transition numbers 712 when the most significant symbol in a stream of symbols is transmitted first. The logic 720 may be implemented in a converter 704 (cf the converter 502 of FIG. 5). As shown in the simplified block diagram 700, each ternary transition number 712 produced by the converter 704 may be derived from a number of bits in the input data bits 510, and each ternary transition number 712 may include 12 digits ($T_0, T_1 \ldots T_{11}$) 702, whereby $T_0$ represents the $3°$ digit and is the least significant digit, while $T_{11}$ represents the $3^{11}$ digit and is the most significant digit. The ternary transition numbers 712 are subsequently transcoded into symbols that are transmitted to a receiving device.

In this example, conversion starts with $T_{11}$. FIG. 6 illustrates the 12 digit ternary number 602 being sent in order of $T_0, T_1, T_2, \ldots, T_{11}$, while FIG. 7 relates to an example in which the 12 digit ternary number 702 is sent in order of $T_{11}, T_{10}, T_9, \ldots, T_0$. Certain differences are identifiable between the example logic 620 and 640 of FIG. 6 and the circuit 720 in FIG. 7. The circuit 640 of FIG. 6 includes 24 flip-flops and is quite complex in comparison to the circuit 720 of FIG. 7, which includes a multiplexer, 20 flip-flops, and logic devices. Accordingly, the logic and circuitry involved is simplified in complexity and is less expensive when the most significant bit is sent first, because of a reduction in logic gates.

As noted, the logic 620, 640 of FIG. 6 illustrates least significant symbol first (LSS first) logic and circuitry because the least significant symbol is transmitted to the receiving device first, while the logic 720 of FIG. 7 illustrates an example where the most significant symbol is transmitted to the receiving device first (MSS first). As used herein "least significant symbol" refers to the transcoded symbol corresponding to the least significant digit of the ternary number. For example, when $T_0$ is transcoded into a sequential symbol, that symbol is the least significant symbol because it originated from the least significant ternary digit. And when the symbol-to-transition number converter (e.g., decoder 524 of FIG. 5) then converts the transcoded (sequential) symbol to a transition number 532, i.e., one ternary digit number it will be the least significant digit. Similarly as used herein "most significant symbol" refers to the transcoded symbol corresponding to the most significant digit of the ternary number.

Figure 8:
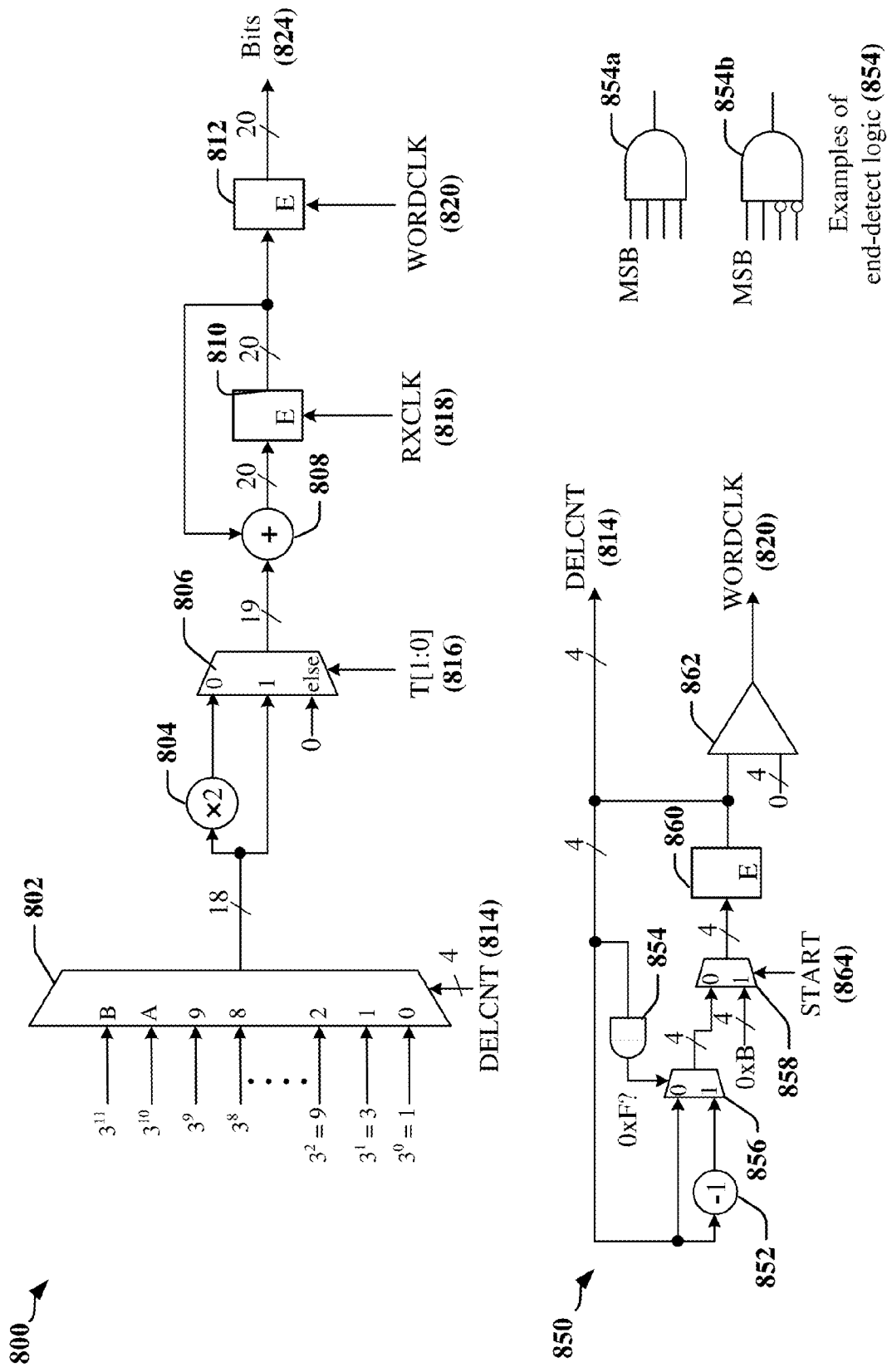
FIG. 8 illustrates an example of circuitry that may be used for converting a twelve digit ternary number into a plurality of bits.

FIG. 8 illustrates an example of circuitry 800 that may be used for converting a twelve digit ternary number into output bits 824. As described herein, original data 510 of nineteen (19) or twenty (20) bits, for example, may be converted into a ternary transition number in reverse order, whereby the most significant bit is supplied to a converter first (see FIG. 7 and descriptions). The transition number may be converted (i.e., transcoded) to sequential symbols again in reverse order, and these transcoded symbols are transmitted on the bus in reverse order. A receiving device (e.g., a slave device) receives the reverse order transmission and performs clock recovery and symbol sampling to convert the transcoded symbols back to a ternary number which is then supplied in reverse order to a circuit which converts the ternary number back to the 20 bit binary original data. The circuit 800 may use a multiplexer 802 with twelve inputs coupled to a single output to a logic device.

The selection between most significant symbol first and least significant symbol first modes of operation may be controlled by the direction in which a counter 850 counts. For example, most significant symbols may be handled first when the counter 850 is configured or controlled to operate as a down counter that decrements from hexadecimal "0xB" (i.e. decimal "11"). Least significant symbols may be handled first if the counter 850 is configured or controlled to operate as an up counter that increments from hexadecimal "0x0" (i.e. decimal "0"). Alternatively or additionally, the order of the inputs to the multiplexer 802 may be configured such that the multiplexer 802 responds to the output (DELCNT) 814 of the counter 850 to produce a desired order of output ternary transition numbers.

The counter 850 may provide the DELCNT 814 output using a register or latch 860 synchronized to a clock that may be derived from a system clock and/or an output of the CDR circuit 528. The register 860 receives a four-bit input from first multiplexer logic 858 that selects between a next value or a start value based on a control signal (START signal) 864 that initializes the counter 850. The start value may be set to 0xB when the converter operates in a most significant symbol first mode, and may be set to 0x0 when the converter operates in a least significant symbol first mode. The first multiplexer logic 858 receives the next value from second multiplexer logic 856 that selects between a modified version of the DELCNT 814 output and the DELCNT 814 output based on the detection of an end condition by end-detection logic 854. The modified input of the second multiplexer 856 may be the result of a function 852, which may be provided by subtraction logic for count-down operation or from addition logic for count-up operation. As depicted, the second multiplexer logic 856 repeats the DEL-CNT 814 output after the DELCNT 814 output is decremented from 0x0 to 0xF, indicating the end of the current conversion. For a count down mode of operation, end-detection logic 854a may be configured to detect a 0xF value on DELCNT 814, and the end-detection logic 854a switches the second multiplexer logic 856 output to cause DELCNT 814 to remain at 0xF until the START signal 864 causes a start value to be loaded. For a count up operation, end-detection logic 854b may be configured to detect a 0xC (decimal "12" or binary "1100") value on DELCNT 814.

Example of CCIe Encoding

Figure 9:
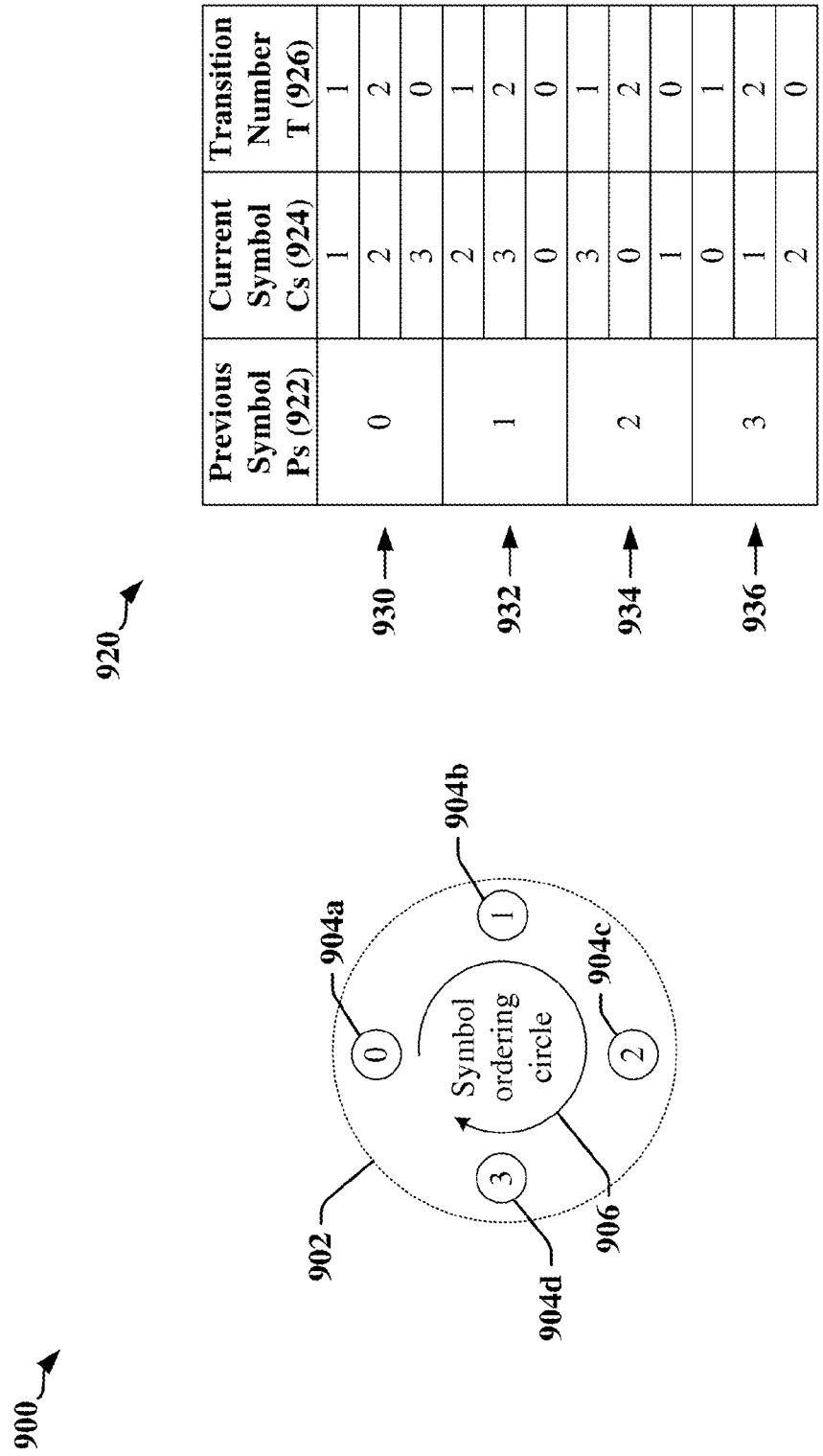
FIG. 9 illustrates an encoding scheme for transcoding data according to certain aspects disclosed herein.

FIG. 9 is a drawing illustrating an encoding scheme 900 that may be used by the encoder 504 to produce a sequence of symbols 514 from ternary transition numbers 512, where the sequence of symbols 514 has embedded clock information and is for transmission on the CCIe bus 430. The encoding scheme 900 may also be used by a encoder 524 to extract ternary transition numbers 532 from symbols 534 transmitted on the CCIe bus 930. In the CCIe encoding scheme 900, the two wires of the CCIe bus 430 permit definition of 4 basic symbols S: {0, 1, 2, 3}. Any two consecutive symbols in the sequence of symbols 514, 534 have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 922 terminates and a second symbol (current symbol Cs) 924 begins.

According to certain aspects disclosed herein, the three available transitions are assigned a transition number (T) 926 for each Ps symbol 922. The value of T 926 can be represented by a ternary number. In one example, the value of transition number 926 is determined by assigning a symbol-ordering circle 902 for the encoding scheme. The symbol-ordering circle 902 allocates locations 904a-904d on the circle 902 for the four possible symbols, and a direction of rotation 906 between the locations 904a-904d. In the depicted example, the direction of rotation 906 is clockwise. The transition number 926 may represent the separation between the valid current symbols 924 and the immediately preceding symbol 922. Separation may be defined as the number of steps along the direction of rotation 906 on the symbol-ordering circle 902 required to reach the current symbol Cs 924 from the previous symbol 922. The number of steps can be expressed as a single digit base-3 number.

It will be appreciated that a three-step difference between symbols can be represented as $0_{base-3}$. The table 920 in FIG. 9 summarizes an encoding scheme employing this approach. In this example, the transition number T may be assigned according to:

$$T_{tmp}[1:0]=4+Cs-Ps$$

$$T=T_{tmp}[1:0]==3?0:T_{tmp}[1:0]$$

Conversely, the current sequential symbol (Cs) may be assigned according to:

$$T_{tmp}=T==0?3:T$$

$$Cs=Ps+T_{tmp}$$

A similar approach may be used for an n-wire system by constructing a mapping of sequential symbol to transition number table for any n (e.g., n=4, 5, 6, . . . ) that guarantees that the raw symbols will change. For example, in the case of an n-wire system, the transition number T may be assigned according to:

$$T=(Ps\leq Cs)?Cs-Ps:2^n+Cs-Ps.$$

Conversely, in the case of an n-wire system, the current sequential symbol (Cs) may be assigned according to:

$$Cs_{tmp}=Ps+T$$

$$Cs=(Cs_{tmp}<2^n)?Cs_{tmp}:Cs_{tmp}-2^n.$$

At the transmitter 500, the table 920 may be used to lookup a current symbol 924 to be transmitted, given knowledge of the previously generated symbol 922 and an input ternary number, which is used as a transition number 926. At the receiver 520, the table 920 may be used as a lookup to determine a transition number 926 that represents the transition between the previously received symbol 922 and the currently received symbol 924. The transition number 926 may be output as a ternary number.

Figure 10:
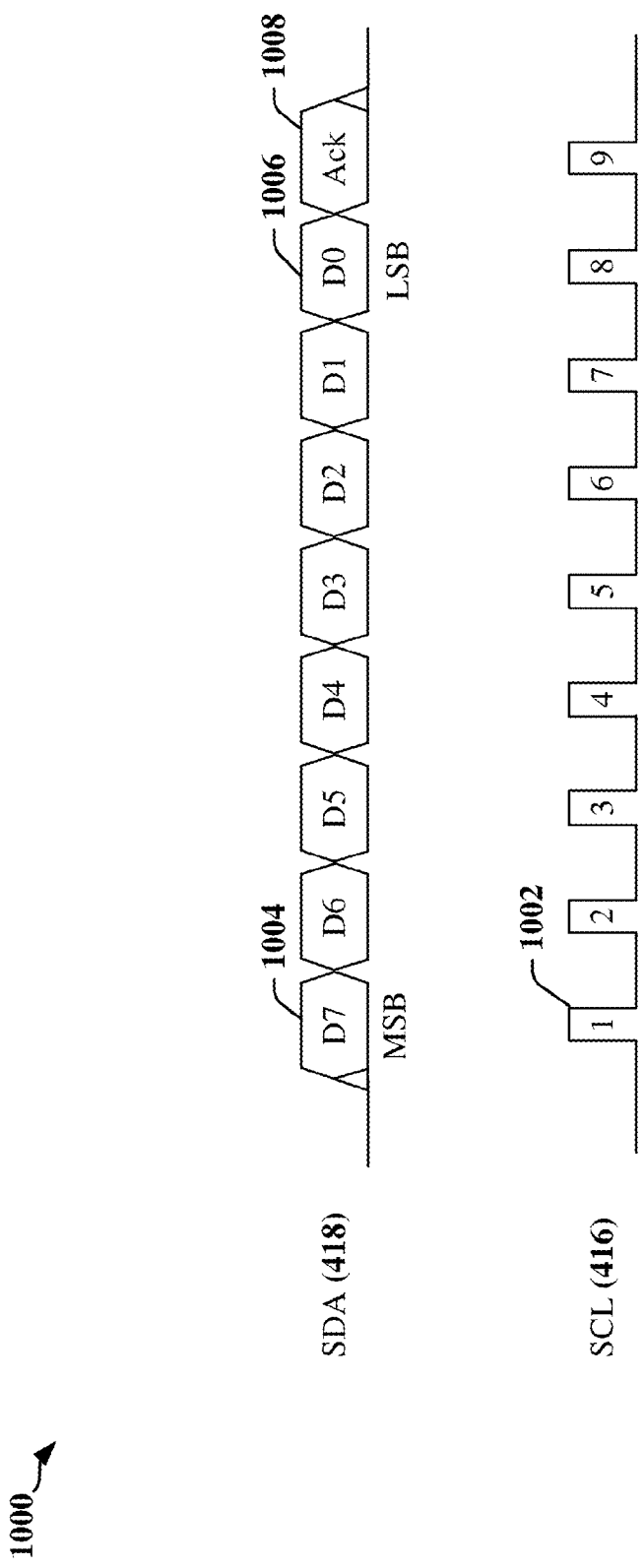
FIG. 10 illustrates a typical I2C bit transfer cycle of the legacy I2C protocol.
Figure 11:
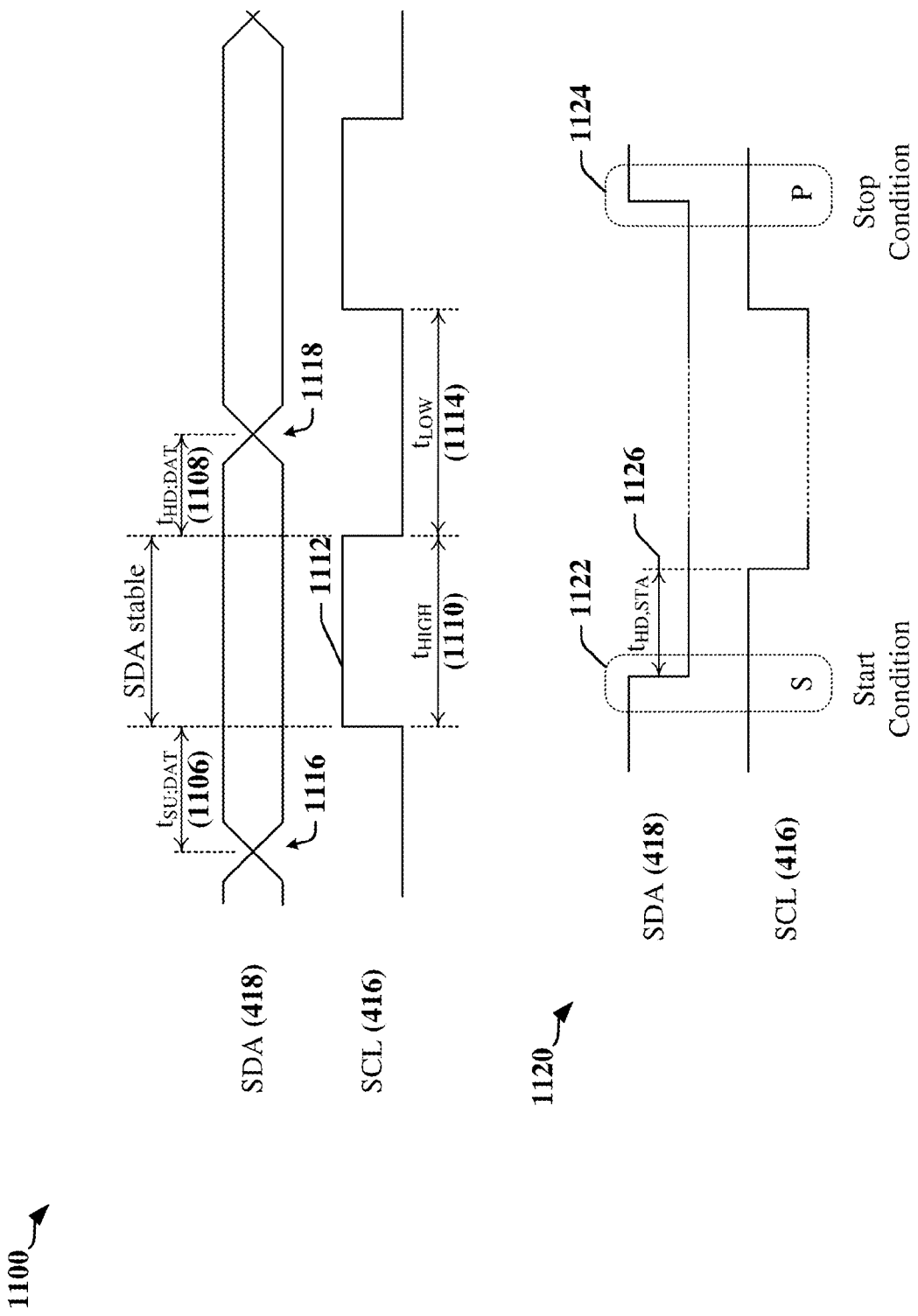
FIG. 11 illustrates the relationship between SDA and SCL signal wires on a conventional I2C bus.

FIGS. 10 and 11 illustrate certain aspects of a legacy I2C interface. FIG. 10 is a timing diagram 1000 illustrating a typical I2C bit transfer cycle of the legacy I2C protocol. The SCL line 416 may be dedicated to send a clock signal from a master node to the slave nodes. The SDA line 418 may serve to transfer 7-bit sequences with an ACK 1008 provided by the receiver at the end. The I2C protocol provides for transmission of 8-bit data (bytes) and 7-bit addresses with a bit to indicate whether a read or write operation is commanded. Data transmissions are acknowledged by the receiver that drives the SDA signal wire 418 for one clock period, such that a low signaling state represents an acknowledgement (ACK) indicating successful reception and a high signaling state represents a negative acknowledgement (NACK) indicating a failure to receive or an error in reception. One data bit 1004, 1006 or ACK (1008) is transmitted for each clock cycle on the SCL line 416. In one example, a data bit state 1004 may be read from the SDA line 418 when the clock state of the SCL line 416 is in a high logic state 1002.

FIG. 11 is a timing diagram that illustrates the relationship between SDA and SCL signal wires on a conventional I2C bus, and the drawing includes timing diagrams 1100 and 1120 that illustrate the relationship between SDA and SCL signal wires 418, 416 on a conventional I2C bus. The first timing diagram 1100 illustrates the timing relationship between the SDA signal wire 418 and the SCL signal wire 416 while data is being transferred on the conventionally configured I2C bus. The SCL signal 416 provides a series of clocking pulses 1112 that can be used to sample data in the SDA signal wire 418. When the SCL signal wire 416 is in a logic high state during data transmission, data on the SDA signal wire 418 is required to be stable and valid, such that the state of the SDA signal wire 418 is not permitted to change when the SCL signal wire 416 is in a high state.

Specifications for conventional I2C protocol implementations define a minimum duration for the high period ($t_{HIGH}$) 1110 of each pulse 1112 on the SCL signal wire 416, where the pulse 1112 corresponds to the time in which the SCL signal wire 416 is in a High logic state. The I2C Specifications also define minimum durations for a setup time ($t_{SU;DAT}$) 1106 and a hold time ($t_{HD;DAT}$) 1108, during which the signaling state of the SDA signal wire 418 must be stable before and after the pulse 1112 during which the SDA signal wire 418 is in the high logic state. The setup time 1106 defines a maximum time period after a transition 1116 between signaling states on the SDA signal wire 418 until the arrival of the rising edge of a pulse 1112 on the SCL signal wire 416. The hold time 1108 defines a minimum time period after the falling edge of the pulse 1112 on the SCL signal wire 416 until a next transition 1118 between signaling states on the SDA signal wire 418. The I2C Specifications also define a minimum duration for a low period ($t_{LOW}$) 1114 for the SCL signal wire 416, when the signaling state of the SDA signal wire 416 may change. The data on the SDA signal wire 418 is typically captured for the period of time ($t_{HIGH}$) 1110 when the SCL signal wire 416 is in the High logic state after the leading edge of the pulse 1112.

The second timing diagram 1120 of FIG. 11 illustrates signaling states on the SDA signal wire 418 and the SCL signal wire 416 between data transmissions on a conventional I2C bus. The I2C protocol defines a start condition or sequence 1122, in which the SDA signal wire 418 transitions from high to low while the SCL signal wire 416 is maintained in a high state. The I2C protocol defines a stop condition or sequence 1124, in which the SDA line transitions from low to high signaling states while the SCL line 416 is high. As noted herein, the signaling state of the SDA signal wire 418 is expected to remain stable during the high period of a pulse 1112 transmitted on the SCL signal wire 416 when data is being transmitted. Accordingly, a transition of the SDA signal wire 418 while the SCL signal wire 416 is in a logic high state may be interpreted by slave devices as a Start Condition 1122 or a Stop condition 1124.

The Start condition 1122 is defined to permit the current bus master to signal that data is to be transmitted. I2C compatible slave nodes must reset their bus logic on receipt of a Start condition 1122. The Start condition 1122 occurs when the SDA signal wire 418 transitions from high to low while the SCL signal wire 416 is high. The I2C bus master initially transmits the Start condition 1122, followed by a 7-bit address of an I2C slave device with which it wishes to exchange data. The address is followed by a single bit that indicates whether a read or write operation is to occur. The addressed I2C slave device, if available, responds with an ACK bit. The master and slave I2C devices then exchange bytes of information in frames, in which the bytes are serialized such that the most significant bit (MSB) 1004 is transmitted first and the least significant bit 1006 is transmitted last. The transmission of the byte is completed when a Stop condition 1124 is transmitted by the I2C master device. The Stop condition 1124 occurs when the SDA signal wire 418 transitions from low to high while the SCL signal wire 416 is high. The I2C Protocols require that all transitions of the SDA signal wire 418 occur when the SCL signal wire 416 is low, and exceptions may be treated as a Start condition 1122 or a Stop condition 1124.

When legacy I2C protocols are used, only 1 bit information is sent per cycle with 2-wires 416, 418 of the shared serial bus 430. That is, only 0.5 bit information are transmitted per cycle per wire. According to aspects disclosed herein, improved data rates (i.e., greater than 0.5 bit information per cycle per wire) may be obtained by transmitting data on both the SDA line 418 and the SCL line 416, while embedding the clock within the transmitted symbols. Clock information may be extracted at the receiver without using a phase locked loop (PLL).

Figure 12:
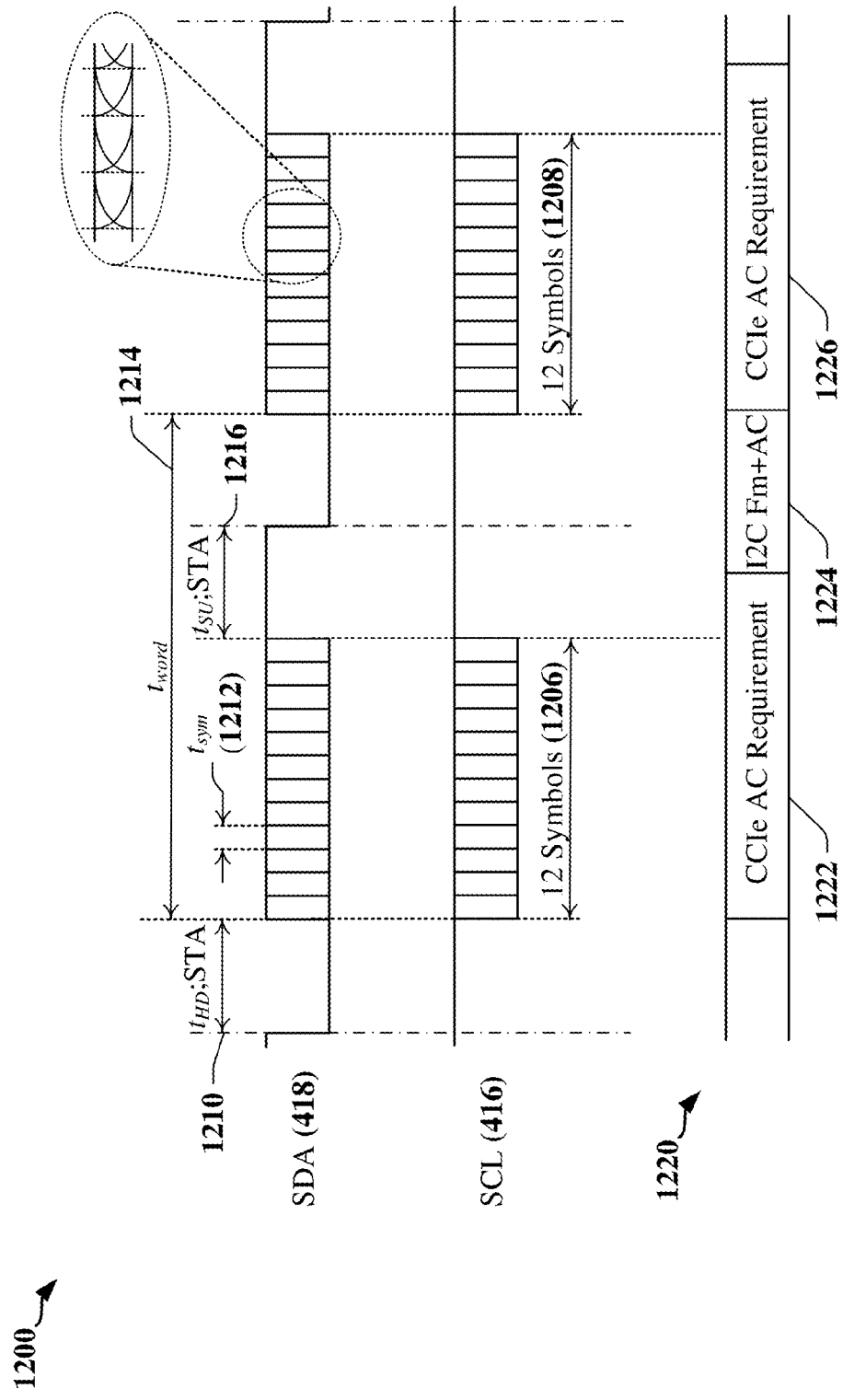
FIG. 12 illustrates an example of data transmission in CCIe mode on a shared bus when devices connected to the bus include an I2C device.

FIG. 12 is a timing diagram 1200 that illustrates an example of data transmission in CCIe mode on the shared bus 430 when the devices 402, 420, 422*a-n* connected to the bus 430 include an I2C device. In the example, the CCIe devices use push-pull drivers to drive the signal wires 418, 416, rather than open-drain drivers used by the I2C device. Data is encoded in sequences of symbols 1206, 1208 that are transmitted on the signal wires 418, 416. An effective data rate of approximately 14 megabits per second (Mbps) may be achieved for the CCIe transmission when the symbol rate is 20 MHz. As described herein, 19 bits of data may be converted to sequences of 12 symbols 1206, 1208, which control the state of the SDA signal 418 and the SCL signal 416 for each symbol period ($t_{sym}$) 1212 in the sequence of symbols 1206 or 1208. As depicted, each symbol period 1212 may be 50 ns in duration. In one example, the 19 bits include 16 bits of data, with 3 bits of overhead.

The timing between consecutive sequences of symbols 1206 and 1208 may be dominated by time periods required to satisfy the protocols governing the operation of I2C devices. In one example, a Start condition precedes each transmission 1206, 1208 and has a duration ($t_{HD}$) of at least 260 ns. The Start condition may be defined by a symbol value of "1" such that the SDA signal 418 is held low while the SCL signal 416 remains high. The Start condition may follow a minimum setup period ($t_{SU}$) 1216 when both signals 418 and 416 are in a high state, as defined by a symbol value of "3." The minimum setup period ($t_{SU}$) 1216 may commence after a transmission 1206 or 1208 terminates, and the minimum setup period ($t_{SU}$) 1216 may be maintained for at least 260 ns. Accordingly, the minimum elapsed time 1214 between the start of a first transmission 1206 and the start of a second transmission 1208 may be calculated as:

$$t_{word} = t_{HD} + t_{SU} + 12 \times t_{sym} = (260 + 260 + 12 \times (50)) \text{ ns} = 1120 \text{ ns}.$$

An additional, nominal 20 ns may be included for signal fall time ($t_f$) between setup and start time. The signal fall time may be calculated as:

$$t_f = \left(20 \times \frac{VDD}{5.5}\right) \text{ ns (min)},$$

$$t_f = 120 \text{ ns (max)}.$$

Accordingly, 19 bits of data may be transmitted in a minimum of 1140 ns, with a corresponding raw bit rate of approximately 16.7 Mbps and a useful bit rate of approximately 14.04 Mbps, since 16 bits are transmitted in the 12 symbols.

The minimum required time between the transmissions 1206 and 1208 is significantly greater when I2C devices are accommodated on the bus 430 than when only CCIe devices are involved in the communication. FIG. 12 includes a timing diagram 1220 that illustrates the increased time 1224 of adding I2C setup and start periods in order to provide backwards compatibility for I2C devices.

Figure 13:
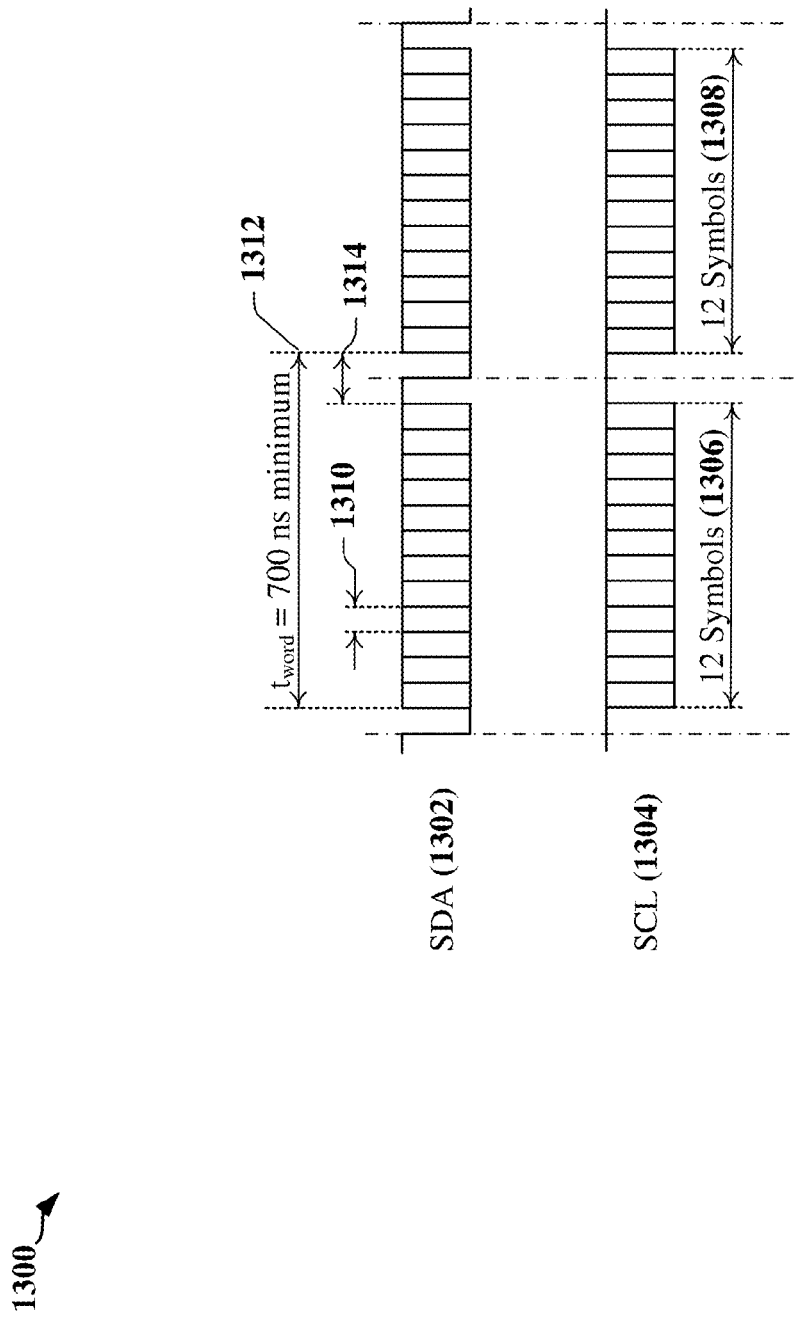
FIG. 13 illustrates data transmission on a CCIe bus when the devices on the bus 430 do not include an active I2C device.

FIG. 13 is a timing diagram 1300 that illustrates data transmission on a CCIe bus 430 when the devices 402, 420, 422*a-n* on the bus 430 do not include an active I2C device. The duration of Start conditions may be reduced. In this example, push-pull drivers are used to drive the signal wires 418, 416. A link rate of 22.86 Mbps may be achieved with a 20 MHz symbol rate. Sequences of 12 symbols 1306, 1308 encode 16 bits of data and 3 bits of overhead. Each symbol in the sequence of 12 symbols 1306, 1308 defines the state of the SDA signal 418 and the SCL signal 416 for each symbol period ($t_{sym}$) 1310. Each symbol period 1310 may be 50 ns in duration for a 20 MHz symbol clock. The two-symbol sequence {3,1} is transmitted in the period 1314 between consecutive sequences of symbols 1306 and 1308.

The minimum elapsed time 1312 between the start of a first transmission 1306 and the start of a second transmission 1308 may be calculated as:

$$t_{word}=14 \times t_{sym}=700 \text{ ns}$$

When CCIe devices with push-pull drivers are used, 19 bits of data may be transmitted in 700 ns, providing a raw bit rate of approximately 27.1 Mbps with a useful bit rate of approximately 22.86 Mbps, since 16 data bits are transmitted in each 12 symbol word 1306, 1308.

Figure 14:
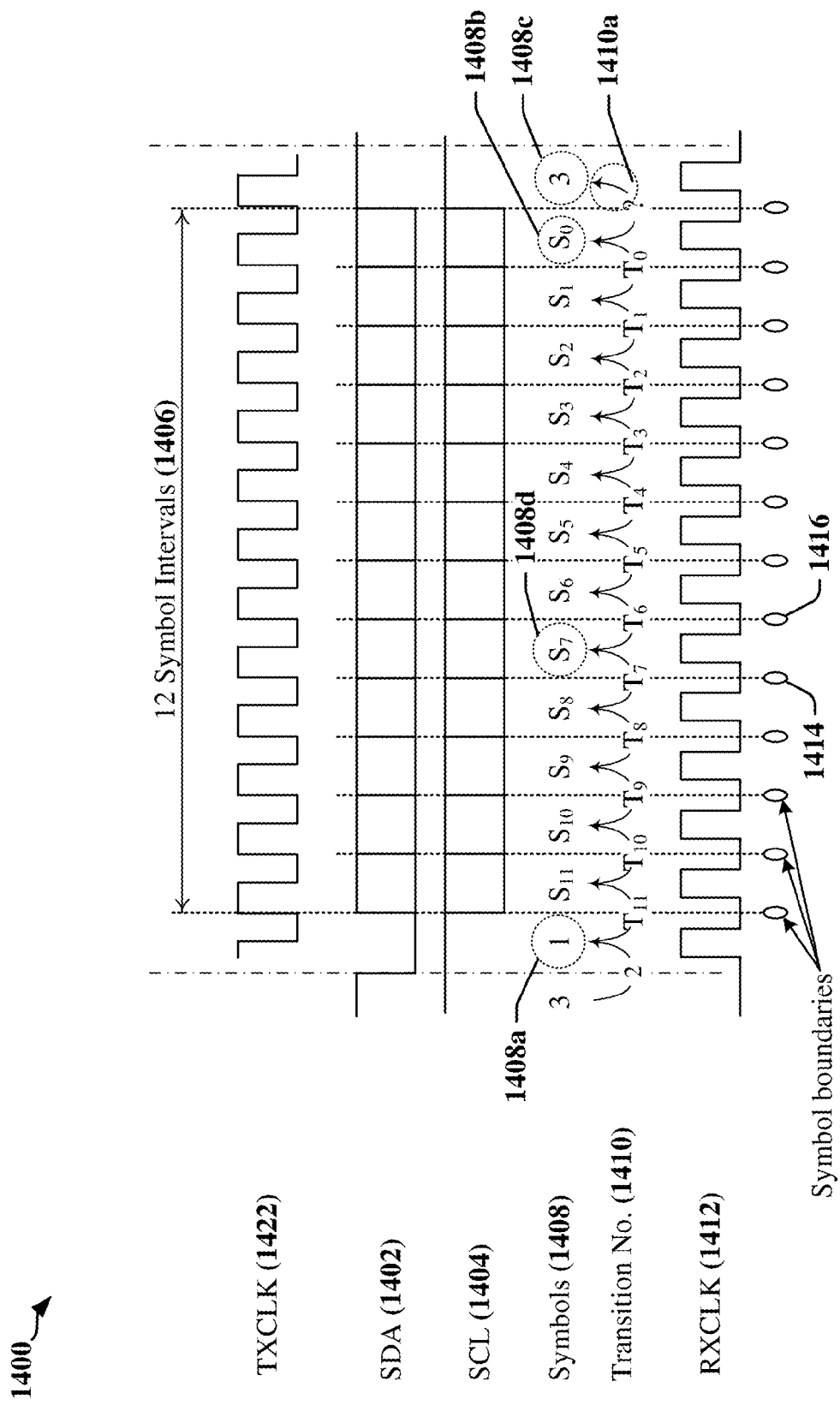
FIG. 14 illustrates generation of symbols for transmission on a serial bus that is configured for a CCIe mode of operation.

FIG. 14 illustrates certain aspects associated with a serial bus 430 that is configured as a CCIe interface. The timing diagram 1400 corresponds to signaling associated with the CCIe transmitter 500 and receiver 520 depicted in FIG. 5. The timing diagram 1400 illustrates an example in which a transmit clock (TXCLK) 1422 is embedded in a sequence of symbols 1408 transmitted on the SDA wire 418 and the SCL wire 416 during data transmissions. In one example, clock information may be embedded in the sequence of symbols 1408 using transition clock transcoding. For instance, data 510 to be transmitted over the physical link 430 is transcoded such that a state change occurs after every symbol cycle of the transmitted symbols 1408. Consequently, the TXCLK 1422 can be embedded in changes of symbol states that occur at symbol boundaries of every symbol cycle, including the symbol boundaries 1414 and 1416 associated with Symbol $S_7$ 1408d, for example. A receiver 520 can generate a receive clock (RXCLK) 1412 from clock information recovered from the state transition at each symbol boundary 1414, 1416 in the sequence of transmitted symbols 1408. The receiver 520 can then reverse the transcoding of the transmitted symbols 1408 to obtain the original data 530. This allows both wires of the I2C bus 430 to be used to send data. Additionally, the symbol rate can be significantly increased since it is no longer necessary to have a setup and hold time (as illustrated in FIG. 11) between clock and data signals.

In the example depicted in the timing diagram 1400 data 510 may be encoded in a stream of symbols 1408 transmitted in 12-symbol sequences or intervals 1406. Each 12-symbol sequence 1406 includes a Start symbol 1408a and a termination or Setup symbol 1408c. The combination of the Setup symbol 1408c and the Start symbol 1408a forms a sequence of symbols {3,1} between sequences of 12 symbols 1406 transmitted on the CCIe bus. As described herein, any two consecutive symbols in a sequence of symbol 1406 produce different signaling states on the shared bus 430, such that a receiver may derive the RXCLK 1412 from the symbol transitions occurring at symbol boundaries 1414, 1416 in the 12-symbol sequence 1406. Transitions between symbols may be identified from transition numbers 1410, as described herein. A CCIe encoder may generate a sequence of 12 symbols 1408, the start symbol 1408a, and the setup symbol 1408b.

According to certain aspects, a serial bus 430 can support both I2C devices and CCIe devices at the same time. As noted herein, clock information that would be transmitted as a clock signal on the SCL signal wire 416 for I2C modes of communication can be embedded within symbol transitions, thereby permitting the use of the SCL signal wire 416 to be used to carry symbol information. Certain signaling characteristics of the I2C protocol may be leveraged to enable operability of the shared bus 430 for I2C and CCIe modes. For example, the I2C protocol requires that all I2C compatible slave nodes must reset their bus logic on receipt of a Start condition, which occurs when a high-to-low transition on the SDA line 418 occurs while the SCL line 416 is high.

Example of Signaling on a Bus Operable for CCIe and I2C Communications

Figure 15:
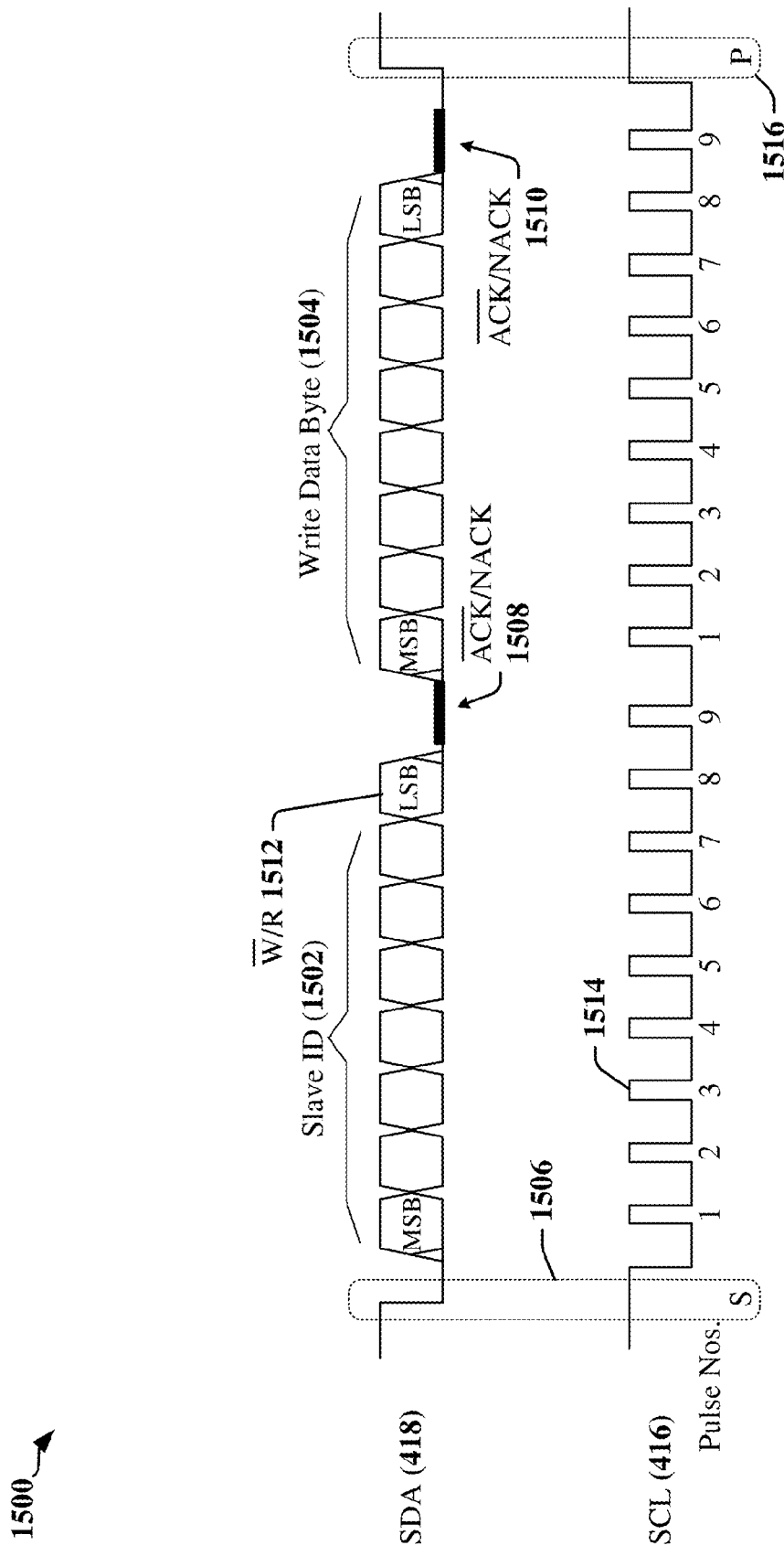
FIG. 15 illustrates an I2C one byte write data operation.

FIG. 15 is a timing diagram 1500 illustrating an I2C one-byte write data operation. An I2C master node transmits a 7-bit slave ID 1502 on the SDA line 418 to indicate which slave node on the I2C bus 430 the master node wishes to access, followed by a Read/Write bit 1512 that indicates whether the operation is a read or a write operation. The Read/Write bit 1512 is at logic 0 to indicate a write operation and at logic 1 to indicate a read operation. Only the slave node whose ID matches the 7-bit slave ID 1502 can respond to the write (or read) operation. In order for an I2C slave node to detect its own ID 1502, the master node transmits at least 8-bits on the SDA line 418, together with 8 clock pulses on the SCL line 416. This behavior may be exploited to transmit data in CCIe operating modes in order to prevent legacy I2C slave nodes from reacting to CCIe operations.

Figure 16:
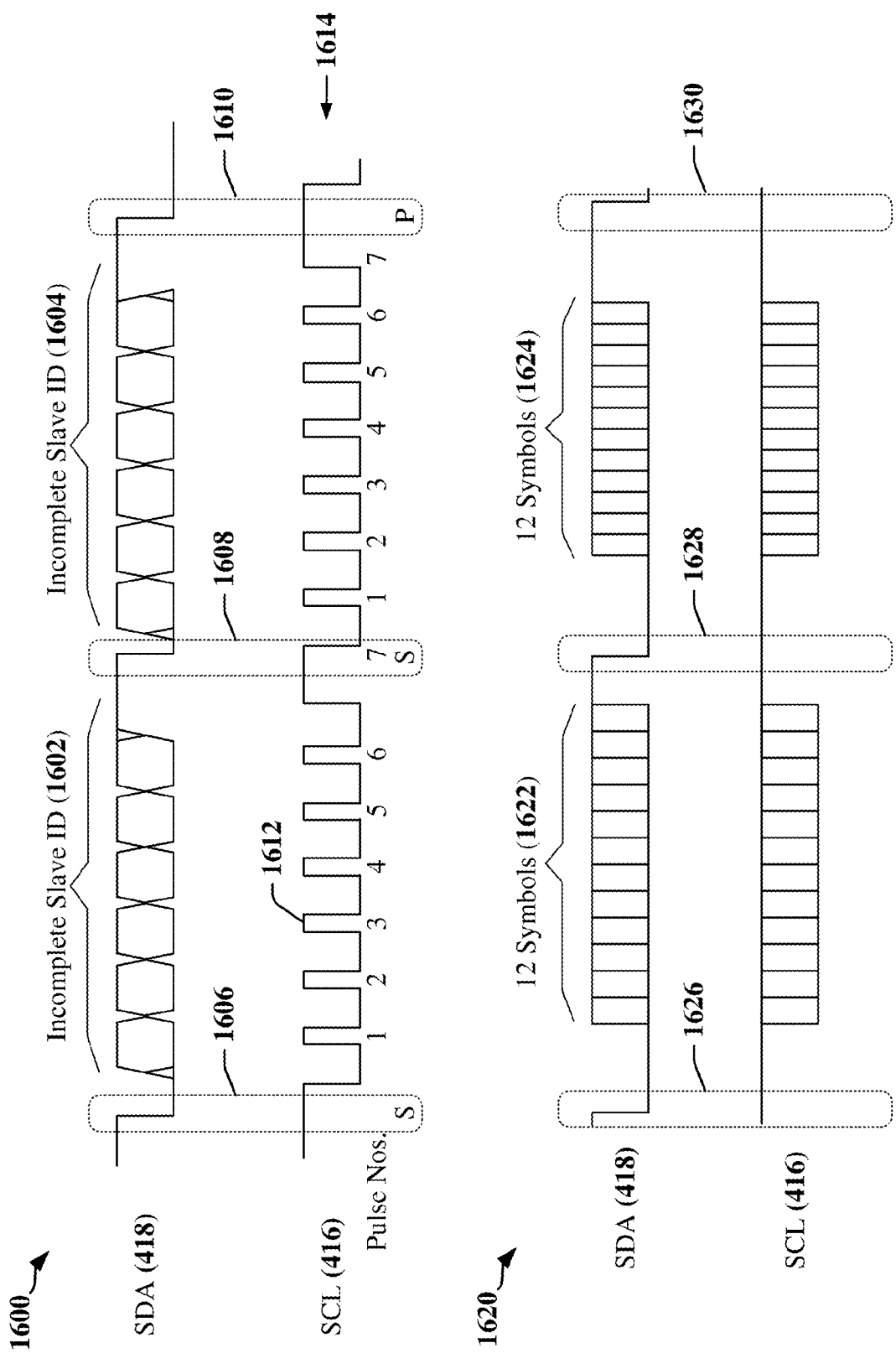
FIG. 16 illustrates one example of the effect of a START condition on a legacy I2C slave node.

FIG. 16 provides one example 1600 illustrating the effect of a Start condition 1606, 1608 or 1610 on a legacy I2C slave node, where the Start condition 1606, 1608 or 1612 is indicated by a high to low signaling state transition on the SDA line 418 while the SCL line 416 is in a high signaling state. In this example 1600, certain Start conditions 1608 or 1612 may be detected before a complete, 7-bit slave ID has been transmitted. The resultant incomplete slave ID 1602, 1604 is not recognized by any slave device. In operation, the effect of a master node issuing a Start condition 1608, 1610 after sending only 6 pulses 1612 on the SCL line 416 includes causing all legacy I2C slave nodes to reset their bus logic before the possibility of recognizing their respective I2C slave ID on the SDA line 418 occurs. In other words, the 6-bit sequences 1602, 1604 on the SDA line 418 sent between two Start conditions 1606, 1608 and/or 1610 are not decoded as a valid slave ID by any of the slave nodes. Consequently, legacy I2C slave nodes are not expected to respond to the incomplete Slave IDs 1602, 1604.

FIG. 16 also includes an example 1620 illustrating the use of the combination of the SCL line 416 and the SDA line 418 of an I2C bus for data transmission in a CCIe mode. A CCIe symbol may be transmitted at a time corresponding to each toggle of a clock signal 1614 transmitted on the SCL line 416 for an I2C transmission. The number of clock toggles transmitted between two Start conditions 1608, 1610 may therefore define the number of symbols that may be transmitted for each CCIe transmission. Accordingly, 12 symbol transmissions 1622, 1624 may be provided in the 12 signaling states available during a 6-SCL pulse sequence that is equivalent to an incomplete Slave ID 1602, 1604 transmission, without causing any slave nodes to detect the sequence as an I2C slave ID.

Transitions occurring on the SDA line 418 coincident with a transition on the SCL line 416 are inconsequential to legacy I2C devices, which may interpret such transitions as a Start condition. However, the legacy I2C device detects a later occurring valid Start condition 1628, 1630, which resets the bus logic detection of the I2C slave node. The I2C slave nodes may also interpret some SDA transitions occurring during the CCIe transmissions 1622, 1624 as a Stop condition, but detection of such a Stop condition within the CCIe transmissions 1622, 1624 merely causes earlier termination of the incomplete SID 1602, 1604. Similarly, detection of a Start condition during the CCIe transmissions 1622, 1624 causes performance of a bus logic reset by the I2C function of the slave nodes.

Therefore, it is apparent that the legacy I2C slave nodes can be expected to ignore the 12 symbol CCIe transmissions 1622, 1624 associated with a 6 SCL pulse sequence as an incomplete I2C slave ID 1602, 1604. Therefore, during the 12 SCL toggles available between Start conditions 1606, 1608, and 1610, twelve (12) symbols may be transmitted on the SCL line 416 and/or the SDA line 418.

The SCL line 416 and/or the SDA line 418 of an I2C bus may be utilized for data transmission in CCIe mode when a clock signal has been embedded within symbol transitions. Consequently, the SDA line 418 and SCL line 416 can be used to transmit any arbitrary 12 symbols between two consecutive Start conditions 1626, 1628 and/or 1630, without affecting legacy I2C slave node functionality and without using a bridge device to segregate legacy I2C slave nodes from the CCIe-capable nodes. In I2C mode, a Start condition is sent only by an I2C master, while a Start condition is sent by whichever node transmits the 12-symbol word in CCIe mode.

Figure 17:
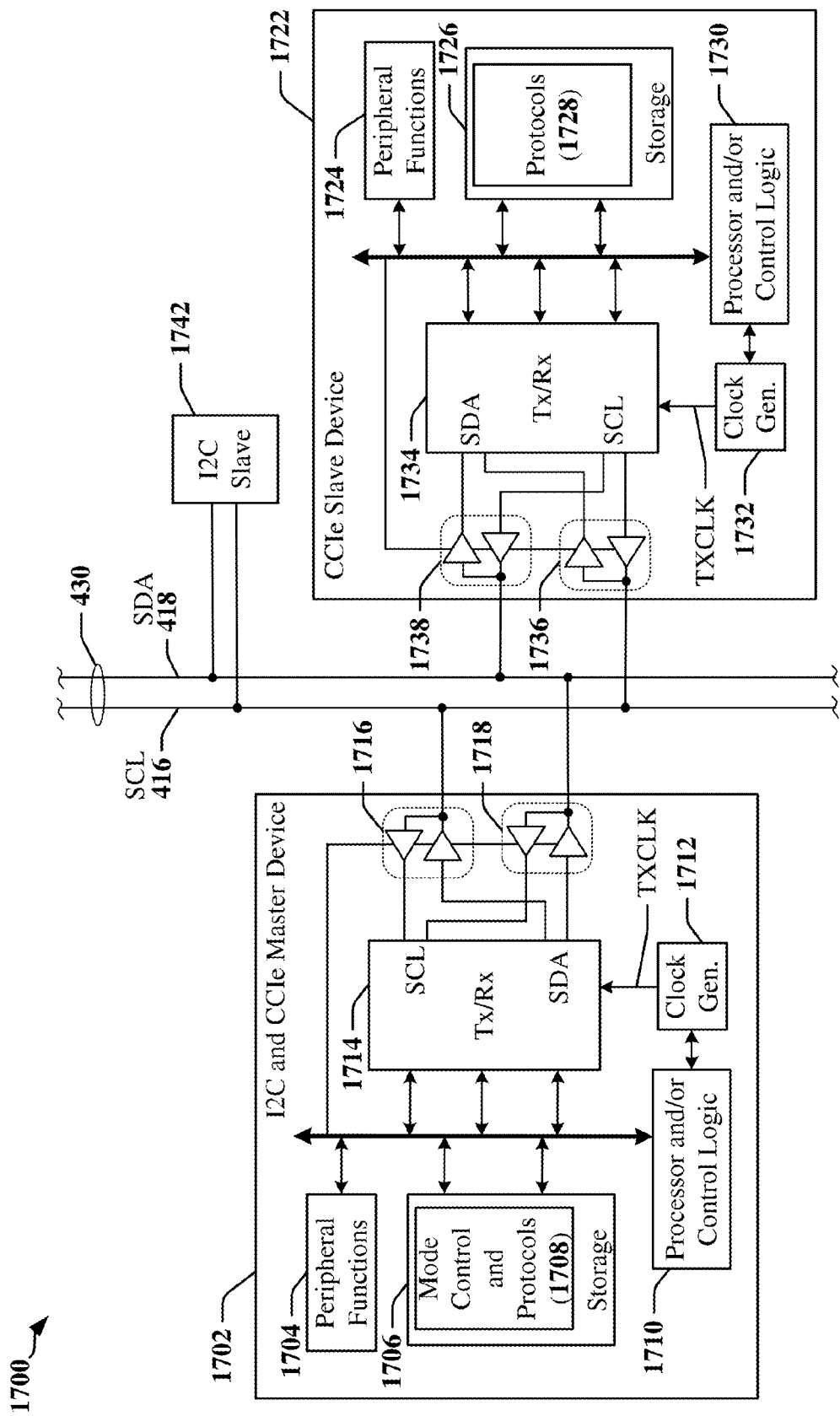
FIG. 17 illustrates a system that includes a plurality of devices that can communicate in multiple modes on the same serial bus.

FIG. 17 is a block schematic diagram illustrating a system 1700 that includes a plurality of devices 1702, 1722 and 1742 that can communicate using the same two-wire serial bus 430. In one example, the two-wire serial bus 430 may be used in one mode to support communications between two or more devices 1702, 1722 in accordance with CCIe protocols, while in another mode the two-wire serial bus 430 may be used to support communications between two or more devices 1702, 1722, and/or 1742 in accordance with I2C protocols. Accordingly, signaling on the two-wire serial bus 430 may employ certain techniques disclosed herein to ensure that the devices 1702, 1722, and 1742 coupled to the two-wire serial bus 430 do not interfere with one another as a result of signal timing during data transmissions, regardless of the mode of transmission.

In the simplified example depicted, an I2C slave device 1742 may be capable of communications in accordance with I2C protocols, a bus master device 1702 is capable of communications in accordance with I2C and CCIe protocols, and a CCIe slave device 1722 is capable of communications in accordance with CCIe protocols, and possibly in accordance with both CCIe and I2C protocols. In some instances, a CCIe device 1702 and/or 1722 may operate as either a slave or master on the serial bus during CCIe modes of operation. It will be appreciated that the two-wire serial bus 430 may couple other devices, as illustrated in FIG. 3. The apparatus 1700 may be embodied in a wireless mobile device, a mobile telephone, a mobile computing system, a wireless telephone, a notebook computer, a tablet computing device, a media player, a gaming device, an appliance, a wearable computing device, or the like.

The CCIe devices 1702, 1722 may serve one or more particular or designated functions in the system 1700. For example, the CCIe devices 1702, 1722 may include peripheral modules or circuits 1704, 1724 that control or include elements of a user interface, such as a display, image sensor, camera, keyboard, touchscreen sensor, mouse or other pointer, audiovisual codec, modem, global positioning sensor, motion detector, and other devices or components of an apparatus employing the system 1700. In addition, the CCIe devices 1702, 1722 may include a storage 1706, 1726, a processing circuit and/or control logic 1710, 1730 a transceiver 1714, 1734 and line drivers/receivers 1716, 1718, 1736, 1738. The processing circuit and/or control logic 1710, 1730 may include a processor such as a state machine, sequencer, signal processor or general-purpose processor. The transceiver 1714, 1734 may include receiver (Rx) and transmitter (Tx) circuits, together with certain circuits and modules, including timing, control logic, general logic, CDR, encoding, and decoding circuits and/or devices. The transceiver 1714, 1734 may include storage used to maintain status configuration and to provide data buffers.

Clock generation circuitry 1712, 1732 may be provided within or external in the transceiver 1714, 1734 and/or may provide a transmit clock (TXCLK) signal that can be used to determine data transmission rates for I2C and a CCIe communication modes. The SCL connector 416 may carry a clock provided by the clock generation circuitry 1712, 1732 in I2C modes of operation, while timing information may be embedded within sequences of symbols transmitted using the SCL connector 416 and the SDA connector 418 in CCIe modes of operation.

The storage 1706, 1726 may include a processor or computer readable medium that can be used to store data, configuration information, status, and/or software code or instructions. The data may be stored in buffers that supply transmitter circuits and/or buffers that handle incoming data from receiver circuits. The software code or instructions may configure and/or be executed by the processing circuit and/or control logic 1710, 1730 such that the processing circuit and/or control logic 1710, 1730 manages or operates the various constituent elements of the device 1702, 1722 and handles communications protocols in accordance with the current mode of operation of the two-wire serial bus 430.

The master device 1702 may be responsible for controlling modes of operation of the two-wire serial bus 430, and for switching between modes of operation as necessary to permit devices coupled to the two-wire serial bus 430 to communicate with other devices. Accordingly, the master device 1702 may implement one or more protocols 1708 that can identify a slave device 1722, 1742 requiring or requesting access to the two-wire serial bus 430. The master device 1702 may initiate an I2C-mode communications transaction when the I2C slave 1742 is to be addressed and may initiate a CCIe-mode communications transaction when the CCIe slave 1722 is to be addressed. In some circumstances, two or more devices may be addressed in the same transaction and the master device 1702 may determine a mode of communication for such transaction.

Figure 18:
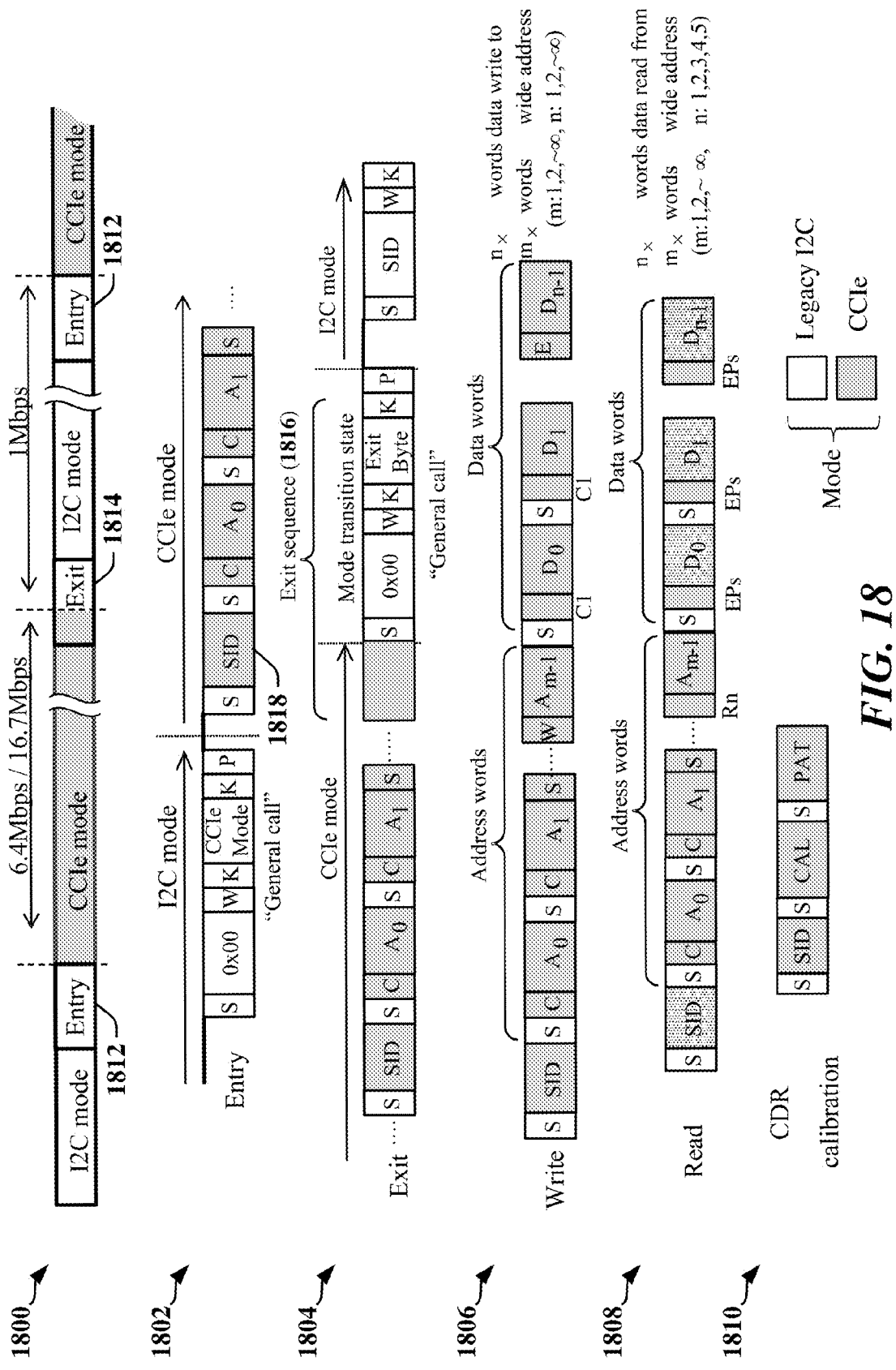
FIG. 18 illustrates certain timing and signaling aspects associated with an example of a CCIe protocol that can operate on a shared serial bus that also supports legacy I2C timing and signaling.

FIG. 18 illustrates certain examples of mode control exercised by a bus master 1702 configured for both I2C and CCIe modes of operation. In the example, certain general timing and signaling aspects of operations on a shared serial bus 430 are illustrated, and it will be appreciated that the structure and content of commands or calls may vary between applications without affecting the concepts illustrated herein. Likewise, operability of systems configured according to certain aspects described herein are not necessarily limited by or dependent the contents or format of transmissions such as CDR calibration transmissions 1810, entry words 1812, exit words 1814 and/or exit sequences 1816, etc.

As illustrated in the first timing diagram 1800, the protocol may define procedures and signaling that causes the shared bus 430 to switch between CCIe and I2C modes.

In one example, the master device 1702 may transmit a CCIe mode entry command 1812 to establish, maintain or transition to CCIe mode communications using the shared serial bus 430. The CCIe mode entry command may be addressed to a CCIe-capable device 1722 while in I2C mode, and the addressed device may reconfigure its transmit and receive circuitry 1734 to support CCIe communications. Based on the type of communication transaction involved, the CCIe-capable device 1722 may encode or decode data for transmission on both wires of the shared serial bus 430, with clock information embedded in sequences of symbols transmitted on the shared serial bus 430. An I2C slave device 1742 coupled to the shared serial bus 430 typically ignores the CCIe transaction. The I2C slave device may perceive an incomplete slave ID transmission, but will reset its receive circuitry when an I2C start condition is transmitted on the shared serial bus 430 between CCIe transmissions. In some circumstances, other unaddressed CCIe devices $314_1$-$314_n$ (see FIG. 3) may monitor the CCIe communications.

The master device 1702 may transmit a CCIe mode exit command 1814 to return to I2C mode communications on the shared serial bus 430. In one example, the shared bus 430 remains in the CCIe mode of operation after entry 1812 to CCIe mode is executed, until and unless an exit 1814 from CCIe mode is executed.

Another timing diagram includes an example showing an entry sequence 1802 that may be used to effect entry into CCIe mode. A CCIe mode entry 1812 may be accomplished as part of a general call transmitted while the shared bus 430 is operating in I2C mode. After CCIe mode is entered, an appropriate slave identifier (SID) 1818 may be transmitted followed by an address identifying one or more CCIe-capable slaves 1722, followed by data transmissions. The address may be a multi-word address and each address word and each data word may be separated by an I2C start command that causes any I2C slave device 1742 to remain inactive on the shared serial bus 430.

Similarly, the CCIe mode exit 1814 may be accomplished by a CCIe mode exit sequence 1804 provided as part of a general call transmitted while the shared bus 430 is operating in CCIe mode. The CCIe exit command 1814 may cause all CCIe devices 1722, and/or $314_1$-$314_n$ to return to I2C mode of operation. Accordingly, CCIe-enabled nodes 1702, 1722, and/or $314_1$-$314_n$ may respond to general calls that include entry/exit sequences 1802, 1804 by switching from I2C mode to CCIe mode and from CCIe mode to I2C mode, respectively.

FIG. 18 also provides an example of a CCIe write data sequence or protocol 1806, and a CCIe read data sequence or protocol 1808. The CCIe write data protocol 1806 may be performed in order to send an arbitrary number of address words and data words to a slave node/device 1722, and/or $314_1$-$314_n$ identified by an SID. A CCIe read data sequence or protocol 1808 may be performed in order to read one to five data words from a slave node/device 1722, and/or $314_1$-$314_n$ identified by an SID. The number of address words may be arbitrary defined.

In some instances, a CDR calibration protocol may be used by the CCIe master node to cause an indicated CCIe node (including the master node itself) to calibrate its CDR logic and to maximize the link rate. For this purpose, the CCIe master node may also have its own SID. CCIe words may be sent in 12-symbols that carry 19-bits information. Except for the CDR calibration protocol, the 16 least significant bits of the 19-bits carry data while 3 most significant bits of the 19-bits may be used for other information such as control information.

Figure 19:
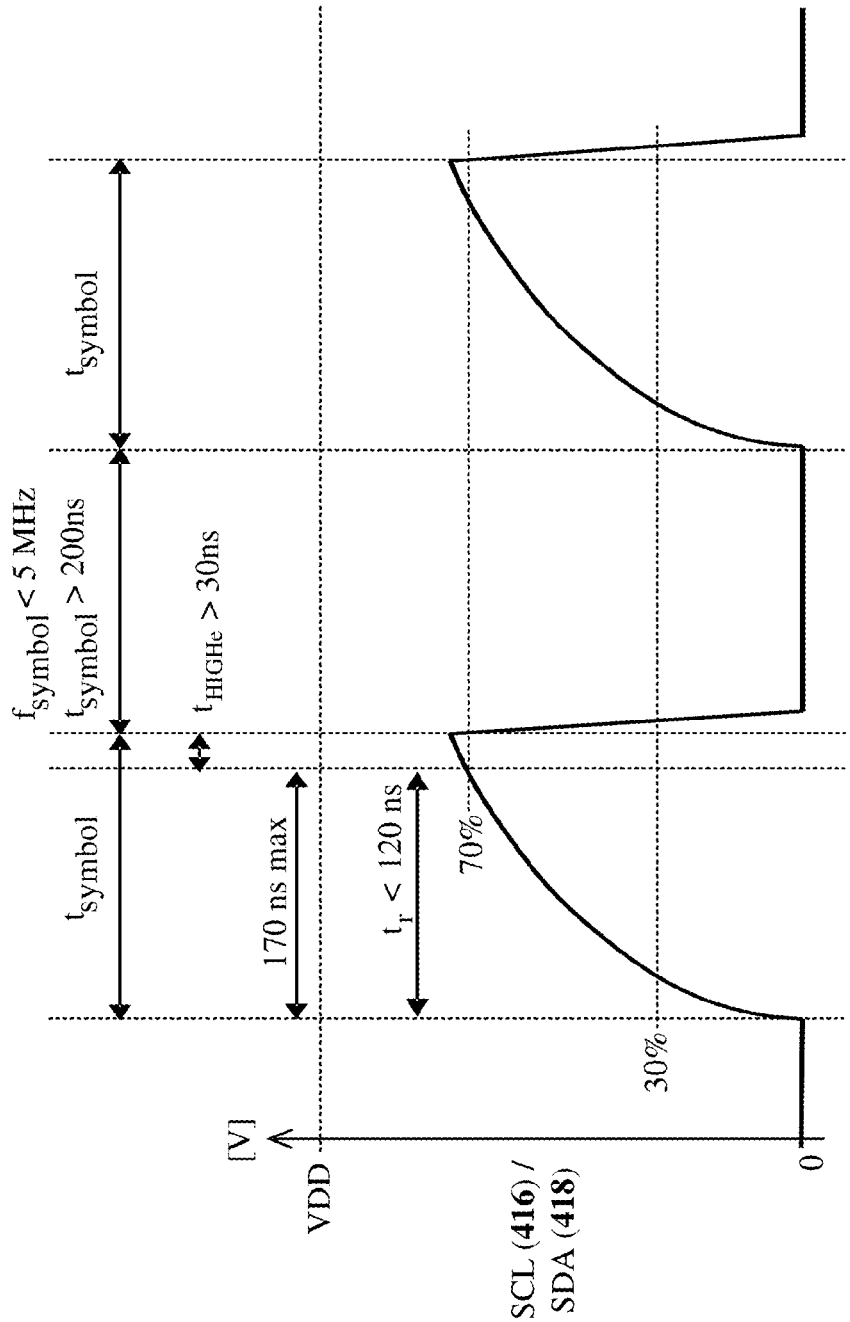
FIG. 19 illustrates one example of CCIe symbol timing on Fm+ capable I2C bus when the CCIe signal is driven by the same physical driver used for I2C Fm+ mode.

Data rates of the CCIe interface 430 may be improved by selection and/or use of push-pull drivers. Referring again to FIG. 12, which illustrates one example of CCIe symbol timing on an Fm+ capable I2C bus 430. The timing of a CCIe signal that is driven by the same physical driver used for I2C Fm+ mode may be limited by the rise time of the drivers, where rise time is the time it takes the line voltage to change from 30% to 70% of VDD level. FIG. 19 is a diagram illustrating one example of CCIe symbol timing on Fm+ capable I2C bus when the CCIe signal is driven by the same physical driver used for I2C Fm+ mode. The rise time for I2C Fm+ is 120 ns, and the time for signal voltage level from 0V to 70% may be calculated as 170 ns. While such rise times may be satisfactory in I2C mode where signaling is often handled by microcontroller based operations, in CCIe mode signaling operations are typically implemented in hardware. Furthermore, microcontroller based or software operated I2C devices may need many cycles to process data, especially while the SCL wire 416 is in logic low state. Accordingly, a minimum low period of SCL may be 1300 ns or more for Fm+, while a minimum high period of 600 ns may be specified by I2C protocols.

According to certain aspects disclosed herein, CCIe mode devices may not attach meaning to the durations, or the differences in durations of logic 1 or logic 0 on each line 416, 418. CCIe communications requires only that a receiver can correctly decode logic 1 and 0 using hardware techniques, and CCIe does not require long high or low periods to perform several actions. Accordingly, the CCIe system may use a clock of 125 MHz or more producing an 8 ns period. In order for a receiver to correctly detect asynchronous input values, the receiver may sample the same value at least 3-times. In one example, a minimum high period of CCIe signal, $t_{HIGH}$, may be set to 30 ns, which is well above the minimum required 24 ns associated with a 125 MHz clock. Thus, the 0-to-70% rise time of 170 ns+30 ns (=200 ns) High time is the minimum possible symbol time, and the resultant maximum symbol rate is 5 MHz.

Figure 20:
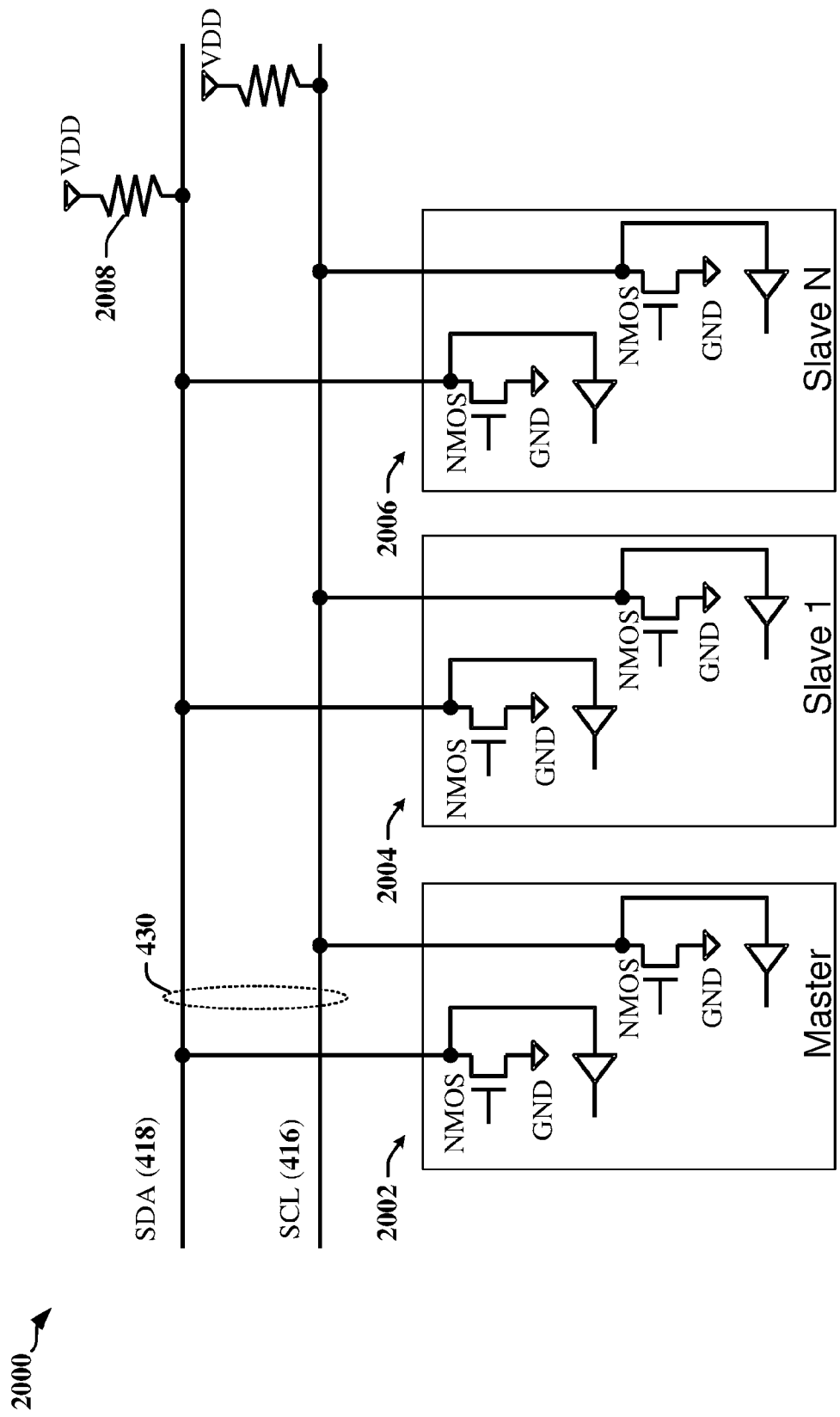
FIG. 20 illustrates an example of open-drain drivers that may be used by CCIe devices coupled to an I2C compatible bus.

The maximum CCIe link rate achievable over an I2C compatible bus may be affected by the type of drivers used by CCIe capable devices. In one example, open-drain drivers 2002, 2004, 2006 (see FIG. 20) may be used by CCIe devices coupled to the I2C compatible bus 430. In this example, each symbol of the 12 symbols 1206, 1208 may be sent in a minimum symbol time 1212 of 200 nanoseconds (ns), such that the 12 symbols 1206, 1208 may be transmitted in 2400 ns. Additionally, Start conditions that comply with I2C timing specifications are necessary when legacy I2C slave devices are coupled to the shared bus 430. A minimum Start condition setup time 1216 and a minimum Start condition hold time 1210 have a specified minimum duration of 260 ns for I2C fast-mode plus (Fm+) operation. Furthermore, the maximum fall time permitted for the SDA line 418 operation is 120 ns for I2C Fm+, which corresponds to the maximum rise time of a pull-up resistor 2008, even when the SDA line 418 is pulled down by transistor 508 of the transmitter 500. For a CCIe device, the fall time for the SDA line 418 may be assumed to have a significantly faster fall time the I2C maximum fall time. For example, the CCIe device may provide a nominal fall time of 20 ns for the SDA line 418 for a Start condition. Thus, the CCIe device may transmit a CCIe word with start condition in 2940 ns. The raw bit rate for a CCIe word carrying 19 bits of information may be calculated as:

$$19 \text{ bits}/2940 \text{ ns} \approx 6.4 \text{ Mbps}.$$

However, each CCIe word may include 16-bits of data and 3 bits of overhead, providing a net data rate calculated as 5.4 Mbps (≈16 bits/2940 ns).

$$16 \text{ bits}/2940 \text{ ns} \approx 5.4 \text{ Mbps}.$$

In another example, CCIe devices may use push-pull drivers instead of open-drain drivers to transmit the 12-symbol CCIe word. Improved performance may result and a link rate of at least 16.7 Mbps can be achieved at a 20 MHz symbol rate. The CCIe devices may use CMOS push-pull drivers that can imitate open-drain driver behavior during I2C operations, including Start conditions in CCIe mode. The CCIe devices may imitate open-drain driver behavior by selectively disabling PMOS transistors of the push-pull drivers. Alternatively or additionally, the CCIe devices may actively drive a high signal state from the PMOS transistors of the push-pull drivers during the 12-symbols in CCIe mode. As a result, a 50 ns symbol period 1212 may be used, enabling transmission of the 12-symbol CCIe words 1206, 1208 in 600 ns. A Start condition duration of $t_{SU}+t_{HD}=540$ ns period (setup time 1216 and hold time 1210) is maintained. In this configuration, it is possible to send one word in 1140 ns for CCIe mode transmissions, which is equivalent to a raw bit rate calculated as:

19 bits/1140 ns≈16.7 Mbps.

However, each CCIe word may include 16-bits of data and 3 bits of overhead, providing a net data rate calculated as:

16 bits/1140 ns≈14.0 Mbps.

In a third example, CCIe-capable devices may use CMOS push-pull drivers for all transmissions when only CCIe-capable devices are coupled to the bus 430. As a result, the symbol period 1212 can conservatively be shortened to 50 ns and transmission of the 12-symbol CCIe words 1206, 1208 in 600 ns can be sent in 600 ns. Because the I2C-compliant Start condition is not required, the Start condition period can be implemented by providing a setup period 1216 for a duration equivalent to the 50 ns symbol period 1212 and the hold period 1210 for the duration equivalent to the 50 ns symbol period 1212, thereby shortening the Start Condition to a duration of 100 ns. In this example, one 19-bit word can be transmitted in 700 ns, which is equivalent to a bit rate of 27.1 Mbps (≈19 bits/700 ns), which is equivalent to a raw bit rate calculated as:

19 bits/700 ns≈27.1 Mbps.

However, each CCIe word may include 16-bits of data and 3 bits of overhead, providing a net data rate calculated as:

16 bits/700 ns≈22.9 Mbps.

First Example of a System Supporting Multiple Modes of Communication

With reference again to FIGS. 3, 4, and 17, a system or apparatus 300, 1700 may employ a plurality of devices 304$_1$-304$_n$, 312, and 314$_1$-314$_n$ that are interconnected by a multimode bus 302. The multimode bus 302 may include a two-wire serial bus 430 that includes a first line 416 and a second line 418. The first mode of operation implements a first protocol for data transmissions over the serial bus 430 and the second mode implements a second protocol for data transmissions over the serial bus 430. The serial bus 430 may operate in I2C and CCIe modes of operation. The bus may be an I2C-compatible bus. In one example the first line 416 may serve as an SCL line when the serial bus 430 operates as an I2C bus, and the second line 418 may serve as an SDA line 416 when the serial bus 430 operates as an I2C bus.

A first set of the devices 312 and/or 304$_1$-304$_n$ that are coupled to the bus 302 may be configured to use the first line for data transmissions and use the second line for a first clock signal, in a first mode of operation and, in a second mode of operation, a second set of devices 312 and/or 314$_1$-314$_n$ that are coupled to the bus may be configured to use both the first line and the second line for data transmissions while embedding a second clock signal within symbol transitions of the data transmissions. The second clock signal may have a greater frequency than the first clock signal.

The first set of devices 312 and/or 304$_1$-304$_n$ and the second set of devices 312 and/or 314$_1$-314$_n$ may concurrently monitor at least the first line in both the first mode and second mode of operation. The first set of devices 312 and/or 304$_1$-304$_n$ and the second set of devices 312 and/or 314$_1$-314$_n$ may concurrently monitor at least the second line in both the first mode and second mode of operation.

In the first mode of operation a master device 312 from the first set of devices 312 and/or 304$_1$-304$_n$ may transmit data to a slave device 304$_1$-304$_n$ from the first set of devices 312, and/or 304$_1$-304$_n$ over the first line of the bus.

In the second mode of operation, a master device 312 from the second set of devices 312 and/or 314$_1$-314$_n$ may transmit data to a slave device 314$_1$-314$_n$ from the second set of devices 312 and/or 314$_1$-314$_n$ over the first line of the bus.

In the second mode of operation, the first set of slave devices 304$_1$-304$_n$ may receive a reset indicator over the first line and second line inhibiting detection of a valid slave node address. The reset indicator may be an I2C start condition, for example. In the second mode of operation, data transmissions may be periodically interrupted when a reset indicator is inserted in the first line and second line, thereby causing the first set of devices 304$_1$-304$_n$ to reset their bus logic prior to detecting a valid sequence of bits.

In the first mode of operation a master node 312 may send a first bit sequence over the first line indicating, to the second set of devices 314$_1$-314$_n$ a switch to the second mode of operation. The master node 312 may send an exit symbol sequence over the bus 430 indicating to the second set of devices 314$_1$-314$_n$ a switch to the first mode of operation.

The second mode of operation may have a higher bit rate of transmission over the bus 430 than the first mode of operation. For example, the first mode of operation may support a maximum bit rate of 1 megabits per second over the bus 430 and the second mode of operation may support a maximum bit rate of 6.4 megabits per second. In another example, the first mode of operation may support a maximum bit rate of 1 megabits per second over the bus 430 and the second mode of operation may support a maximum bit rate of 16.7 megabits per second.

The second set of devices 314$_1$-314$_n$ may be capable of operating in both the first mode of operation and the second mode of operation.

In one example, the bus 430 couples to a baseband processor including a first device from the second set of devices 314$_1$-314$_n$, and to an image sensor including a second device from the second set of devices 314$_1$-314$_n$. The bus 430 may control data signals between the baseband processor and image sensor.

In some instances, each device in the second set of devices 314$_1$-314$_n$ is adapted to convert a sequence of data bits into a plurality of M transition numbers, convert each transition number into a sequential number from a set of sequential numbers, and transmit the sequential number over the bus. The M transition numbers may be expressed as ternary digits. The sequential number may be selected from the transition number based on a transition from an immediately previous sequential number to guarantee that no two sequential numbers are the same. Each transition number may be converted into a sequential number from a set of sequential numbers by converting a plurality of transition numbers into a sequential number.

Second Example of a System Supporting Multiple Modes of Communication

With continued reference to FIGS. 3, 4, and 17, a system or apparatus 300, 1700 may employ a plurality of devices 304$_1$-304$_n$, 312, and 314$_1$-314$_n$ that are interconnected by a multimode bus 302. The bus 302 may include a two-wire serial bus 430 having a first line 418 and a second line 416. The bus may be an I2C-compatible bus. A first set of devices $304_1$-$304_n$, 312 may use the first line 418 for data transmissions and use the second line 416 for a first clock signal in a first mode of operation, while a second set of devices 312, and $314_1$-$314_n$ coupled to the bus may be configured to use both the first line and the second line for data transmissions in a second mode of operation, while embedding a second clock signal within symbol transitions of the data transmissions.

The first set of devices $304_1$-$304_n$, 312 and the second set of devices 312, and $314_1$-$314_n$ may concurrently monitor at least the first line 418 in both the first mode of operation and the second mode of operation. The first set of devices $304_1$-$304_n$, 312 and the second set of devices 312, $314_1$-$314_n$ may concurrently monitor at least the second line 416 in both the first mode and second mode of operation.

In one example, a master device 312 from the first set of devices $304_1$-$304_n$, 312 transmits data to a slave device $304_1$-$304_n$, over the first line 418 of the bus 430 in the first mode of operation. In another example, a master device 312 from the second set of devices 312, $314_1$-$314_n$ transmits data to a slave device $314_1$-$314_n$ over the first line of the bus 430 in the second mode of operation. The second mode of operation may have a higher bit rate of transmission over the bus 430 than the first mode of operation. In one example, the first mode of operation may have a maximum bit rate of 1 megabits per second over the bus 430 and the second mode of operation may have a maximum bit rate of 6.4 megabits per second over the bus 430. In a second example, the first mode of operation may have a maximum bit rate of 1 megabits per second over the bus 430 and the second mode of operation may have a maximum bit rate of 16.7 megabits per second over the bus 430. The second clock signal may have a greater frequency than the first clock signal.

The first mode of operation may implement a first protocol for data transmissions over the bus 430 and the second mode implements a second protocol for data transmissions over the bus 430.

The first set of devices may receive a reset indicator over the first line 418 and second line 416 inhibiting detection of a valid slave node address in the second mode of operation. Data transmissions may be periodically interrupted by inserting a reset indicator in the first line 418 and second line 416 that causes the first set of devices $304_1$-$304_n$ to reset their bus logic prior to detecting a valid sequence of bits in the second mode of operation.

During the first mode of operation, a master node 312 may send a first bit sequence over the first line 418 indicating to the second set of devices $314_1$-$314_n$ that a switch is being made to the second mode of operation. During the second mode of operation the master node 312 may send an exit symbol sequence over the bus 430 indicating to the second set of devices $314_1$-$314_n$ that a switch is being made to the first mode of operation.

In one example, the second set of devices $314_1$-$314_n$ may be capable of operating in both the first mode of operation and the second mode of operation.

In some instances, the bus 430 couples to a baseband processor including a first device from the second set of devices $314_1$-$314_n$, and to an image sensor including a second device from the second set of devices $314_1$-$314_n$. The bus may carry control data signals between the baseband processor and image sensor. Each device in the second set of devices $314_1$-$314_n$ may be adapted to convert a sequence of data bits into a plurality of M transition numbers, convert each transition number into a sequential number from a set of sequential numbers, and transmit the sequential number over the bus 430. The sequential number may be selected from the transition number based on a transition from an immediately previous sequential number to guarantee that no two sequential numbers are the same. Each transition number may be converted into a sequential number from a set of sequential numbers by converting a plurality of transition numbers into a sequential number.

Third Example of a System Supporting Multiple Modes of Communication

With continued reference to FIGS. 3, 4, and 17, a system or apparatus 300, 1700 may employ a plurality of devices $304_1$-$304_n$, 312, and $314_1$-$314_n$ that are interconnected by a multimode bus 302. The bus 302 may include a two-wire serial bus 430 having a first line 418 and a second line 416. The bus may be an I2C-compatible bus. A first set of devices $304_1$-$304_n$, 312 may use the first line 418 for data transmissions and use the second line 416 for a first clock signal in a first mode of operation, while a second set of devices 312, and $314_1$-$314_n$ coupled to the bus may be configured to use both the first line and the second line for data transmissions in a second mode of operation, while embedding a second clock signal within symbol transitions of the data transmissions.

In operation, a processing circuit may be configured to send and receive data to and from a transmitter and receiver circuit, and the transmitter and receiver circuit may be configured to communicate over a bus 430 including a first line 418 and a second line 416. The transmitter and receiver circuit may be configured to use the first line 418 for data transmissions and the second line 416 for a first clock signal in a first mode of operation, and to use both the first line 418 and the second line 416 for transmitting data in a second mode of operation such that a second clock signal is embedded within symbol transitions of the data transmissions.

The device may coexist with a set of other devices coupled to the bus but operate only in the first mode while constantly monitoring at least the first line 418 during both the first mode and second mode of operation. The device may coexist with a set of other devices coupled to the bus 430 but operate only in the first mode while constantly monitoring at least the second line 416 during both the first mode and second mode of operation.

The device may transmit data to a slave device over the first line 418 of the bus 430 in a first mode of operation. The device may transmit data to a slave device over the first line 418 and second line 416 of the bus 430 in the second mode of operation. The first mode of operation may implement a first protocol for data transmissions over the bus 430 and the second mode may implement a second protocol for data transmissions over the bus 430.

The transmitter and receiver circuit may be configured to send a reset indicator over the first line 418 and second line 416 during the second mode of operation to inhibit other devices operating in the first mode from detecting a valid slave node address. The data transmissions during the second mode of operation may be periodically interrupted by inserting a reset indicator in the first line 418 and second line 416 that causes the other devices operating in the first mode to reset their bus logic prior to detecting a valid sequence of bits.

In some examples, the transmitter and receiver circuit is configured to send a first bit sequence over the first line 418 in the first mode of operation indicating a switch to the second mode of operation to the other devices capable of operating in both the first mode and second mode. The master node 312 may send an exit symbol sequence over the bus 430 in a second mode of operation indicating a switch to the first mode of operation to the other devices capable of operating in both the first mode and second mode.

The second mode of operation may have a higher bit rate of transmission over the bus than the first mode of operation. In one example, the first mode of operation has a maximum bit rate of 1 megabits per second over the bus 430 and the second mode of operation has a maximum bit rate of 6.4 megabits per second. In another example, the second clock signal may have a greater frequency than the first clock signal.

Fourth Example of a System Supporting Multiple Modes of Communication

With continued reference to FIGS. 3, 4, and 17, a system or apparatus 300, 1700 may employ a plurality of devices $304_1$-$304_n$, 312, and $314_1$-$314_n$ that are interconnected by a multimode bus 302. The bus 302 may include a two-wire serial bus 430 having a first line 418 and a second line 416. The bus may be an I2C-compatible bus. A first set of devices $304_1$-$304_n$, 312 may use the first line 418 for data transmissions and use the second line 416 for a first clock signal in a first mode of operation, while a second set of devices 312, and $314_1$-$314_n$ coupled to the bus may be configured to use both the first line and the second line for data transmissions in a second mode of operation, while embedding a second clock signal within symbol transitions of the data transmissions.

According to certain aspects disclosed herein, a master device 312 may ascertain whether all devices coupled to the bus are capable of operating according to the third mode of operation that uses both the first line and the second line for data transmissions while embedding a second clock signal within symbol transitions of the data transmissions line for a first clock signal, and causes the devices $304_1$-$304_n$, 312, and $314_1$-$314_n$ to be operated in the third mode of operation only if all devices coupled to the bus are capable of operating in the third mode. In one example, the third mode of operation may provide reduced signaling overhead with respect to the second mode. The set of devices $304_1$-$304_n$, 312, and $314_1$-$314_n$ are configured to operate in the third mode so long as all devices $304_1$-$304_n$, 312, and $314_1$-$314_n$ coupled to the bus are able to operate in the third mode, or so long as all active devices $304_1$-$304_n$, 312, and $314_1$-$314_n$ coupled to the bus are able to operate in the third mode. An active device may be a device that is powered-on, coupled to the bus 430, and/or monitoring the bus 430. The devices $304_1$-$304_n$, 312, and $314_1$-$314_n$ may concurrently monitor at least the first line 418 in both the first mode and second mode of operation. The first set of devices $304_1$-$304_n$, 312 and second set of devices 312, and $314_1$-$314_n$ may concurrently monitor at least the second line 416 in both the first mode and second mode of operation.

In one aspect, the first mode of operation implements a first protocol for data transmissions over the bus 430, the second mode implements a second protocol for data transmissions over the bus 430, and the third mode implements a third protocol for data transmissions over the bus 430. The second mode of operation may permit legacy devices to receive a reset indicator over the first line 418 and second line 416 inhibiting detection of a valid slave node address. In the second mode of operation, data transmissions may be periodically interrupted by inserting a reset indicator in the first line 418 and second line 416 that causes legacy devices coupled to the bus 430 to reset their bus logic prior to detecting a valid sequence of bits. In the third mode of operation, no reset indicator is sent in the first line 418 and second line 416.

The third mode of operation may have a higher bit rate of transmission over the bus 430 than the second mode of operation. The third mode of operation may have a maximum bit rate of 27.1 megabits per second over the bus 430.

In an aspect, a master 312 may ascertain that all devices coupled to the bus can operate according to the third mode, and send a command to all devices $304_1$-$304_n$, 312, and $314_1$-$314_n$ coupled the bus to operate in the third mode.

Example of Processing Systems Configurable for CCIe and I2C Operations

Figure 21:
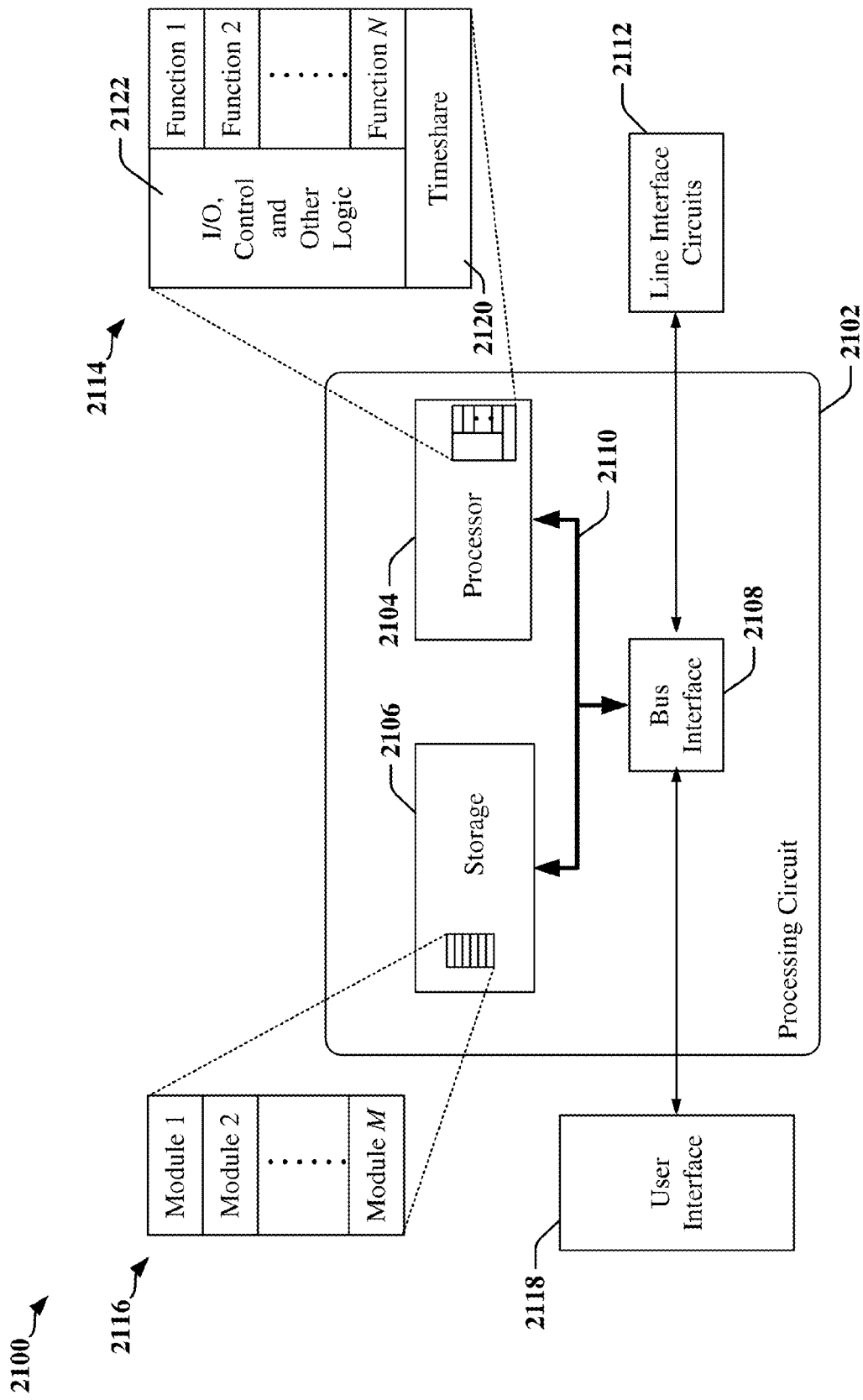
FIG. 21 is a block diagram illustrating an example of an apparatus employing a processing system that may be adapted according to certain aspects disclosed herein.

FIG. 21 is a conceptual diagram 2100 illustrating a simplified example of a hardware implementation for an apparatus employing a processing circuit 2102 that may be configured to perform one or more functions disclosed herein. In accordance with various aspects of the disclosure, an element, or any portion of an element, or any combination of elements may be implemented using the processing circuit 2102. The processing circuit 2102 may include one or more processors 2104 that are controlled by some combination of hardware and software modules. Examples of processors 2104 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2104 may include specialized processors that perform specific functions, and that may be configured, augmented or controlled by one of the software modules 2116. The one or more processors 2104 may be configured through a combination of software modules 2116 loaded during initialization, and further configured by loading or unloading one or more software modules 2116 during operation.

In the illustrated example, the processing circuit 2102 may be implemented with a bus architecture, represented generally by the bus 2110. The bus 2110 may include any number of interconnecting buses and bridges depending on the specific application of the processing circuit 2102 and the overall design constraints. The bus 2110 links together various circuits including the one or more processors 2104, storage 2106. Storage 2106 may include memory devices and mass storage devices, and may be referred to herein as computer-readable media. The bus 2110 may also link various other circuits such as timing sources, timers, peripherals, voltage regulators, and power management circuits, which are well known in the art, and therefore, some of which may not be described any further. A bus interface 2108 may provide an interface between the bus 2110 and line interface circuits 2112. The line interface circuits 2112 provides a means for communicating with various other apparatus over a transmission medium such as a serial bus. Depending upon the nature of the apparatus, a user interface 2118 (e.g., keypad, display, speaker, microphone, joystick) may also be provided, and may be communicatively coupled to the bus 2110 directly or through a bus interface 2108.

A processor 2104 may be responsible for managing the bus 2110 and for general processing that may include the execution of software stored in a computer-readable medium that may include the storage 2106. In this respect, the processing circuit 2102, including the processor 2104, may be used to implement any of the methods, functions and techniques disclosed herein. The storage 2106 may be used for storing data that is manipulated by the processor 2104 when executing software, and the software may be configured to implement any one of the methods disclosed herein.

One or more processors 2104 in the processing circuit 2102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2106 or in an external computer readable medium. The computer-readable medium and/or storage 2106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2106 may also include, by way of example, a carrier wave, a transmission line, and any other suitable medium for transmitting software and/or instructions that may be accessed and read by a computer. Computer-readable medium and/or the storage 2106 may reside in the processing circuit 2102, in the processor 2104, external to the processing circuit 2102, or be distributed across multiple entities including the processing circuit 2102. The computer-readable medium and/or storage 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2106 may maintain software maintained and/or organized in loadable code segments, modules, applications, programs, etc., which may be referred to herein as software modules 2116. Each of the software modules 2116 may include instructions and data that, when installed or loaded on the processing circuit 2102 and executed by the one or more processors 2104, contribute to a run-time image 2114 that controls the operation of the one or more processors 2104. When executed, certain instructions may cause the processing circuit 2102 to perform functions in accordance with certain methods, algorithms and processes described herein.

Some of the software modules 2116 may be loaded during initialization of the processing circuit 2102, and these software modules 2116 may configure the processing circuit 2102 to enable performance of the various functions disclosed herein. For example, some software modules 2116 may configure internal devices and/or logic circuits 2122 of the processor 2104, and may manage access to external devices such as the line interface circuits 2112, the bus interface 2108, the user interface 2118, timers, mathematical coprocessors, and so on. The software modules 2116 may include a control program and/or an operating system that interacts with interrupt handlers and device drivers, and that controls access to various resources provided by the processing circuit 2102. The resources may include memory, storage 2106, processing time, access to the line interface circuits 2112, the user interface 2118, and so on.

One or more processors 2104 of the processing circuit 2102 may be multifunctional, whereby some of the software modules 2116 are loaded and configured to perform different functions or different instances of the same function. The one or more processors 2104 may additionally be adapted to manage background tasks initiated in response to inputs from the user interface 2118, the line interface circuits 2112, and device drivers, for example. To support the performance of multiple functions, the one or more processors 2104 may be configured to provide a multitasking environment, whereby each of a plurality of functions is implemented as a set of tasks serviced by the one or more processors 2104 as needed or desired. In one example, the multitasking environment may be implemented using a timesharing program 2120 that passes control of a processor 2104 between different tasks, whereby each task returns control of the one or more processors 2104 to the timesharing program 2120 upon completion of any outstanding operations and/or in response to an input such as an interrupt. When a task has control of the one or more processors 2104, the processing circuit is effectively specialized for the purposes addressed by the function associated with the controlling task. The timesharing program 2120 may include an operating system, a main loop that transfers control on a round-robin basis, a function that allocates control of the one or more processors 2104 in accordance with a prioritization of the functions, and/or an interrupt driven main loop that responds to external events by providing control of the one or more processors 2104 to a handling function.

Figure 22:
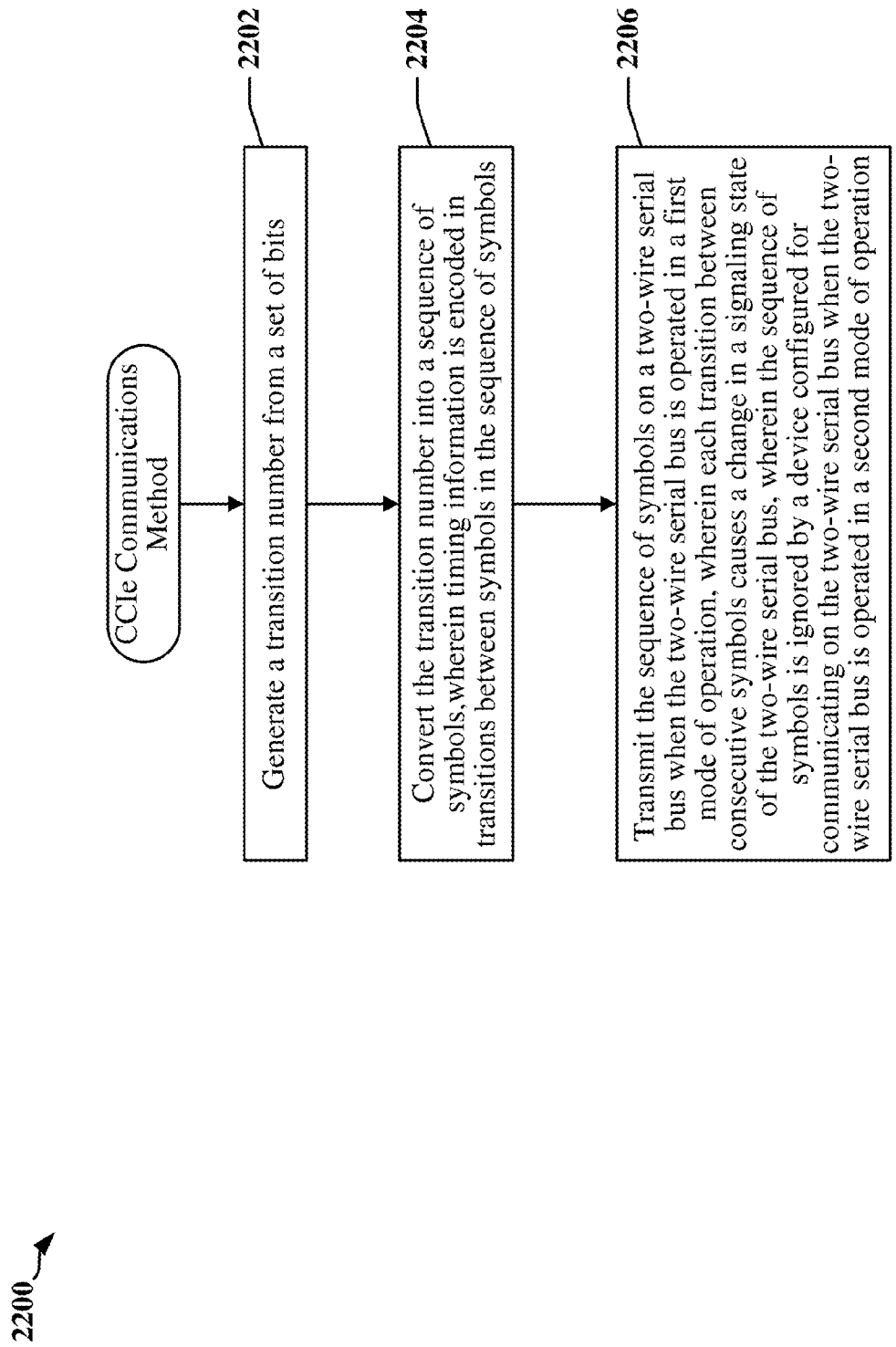
FIG. 22 is a flow chart of a method for transmitting information on a CCIe bus according to one or more aspects disclosed herein.

FIG. 22 is a flowchart 2200 illustrating a method for data communications on a CCIe bus. Various steps of the method may be performed by a transmitter device that includes some combination of the devices and circuits illustrated in FIGS. 1-8, 20, 22 and/or 24, for example.

At block 2202, the device may generate a transition number from a set of bits. The transition number may include a twelve digit ternary number. In one example, the device may generate a transition number from a set of bits. The transition number may be a twelve digit ternary number.

At block 2204, the device may convert the transition number into a sequence of symbols Timing information may be encoded in transitions between symbols in the sequence of symbols. Timing information encoded in the sequence of symbols enables a receiver to generate a receive clock from the sequence of symbols. The transition number may be converted into the sequence of symbols by providing the ternary number to a transcoder.

In one example, the transcoder receives the most significant digit of the ternary number first, the least significant digit of the ternary number may be received by the transcoder last, and intermediate digits between a most significant digit to the least significant digit are provided to the transcoder in order of decreasing significance. In another example, the transcoder receives the least significant digit of the ternary number first, the most significant digit of the ternary number may be received by the transcoder last, and intermediate digits between a most significant digit to the least significant digit are provided to the transcoder in order of increasing significance.

At block 2206, the device may transmit the sequence of symbols on a two-wire serial bus when the two-wire serial bus is operated in a first mode of operation. The sequence of symbols may be ignored by a device configured for communicating on the two-wire serial bus when the two-wire serial bus is operated in a second mode of operation. Four signaling states may be defined for the two-wire serial bus. Each digit of the ternary number may select and/or indicate a next symbol to be transmitted on the two-wire serial bus from one of three available symbols. Each of these three available symbols may be different from a current symbol being transmitted on the two-wire serial bus. Accordingly, each transition between consecutive symbols causes a change in a signaling state of the two-wire serial bus.

In one example, the two-wire serial bus may be a multi-purpose bus that supports CCIe communications when operated in the first mode of operation. For the second mode of operation, the two-wire serial bus may support I2C and/or CCI modes of communication. The device may be configured or adapted to cause a change from the first mode of operation to the second mode of operation when a control sequence is transmitted on the two-wire serial bus. In the CCIe mode of operation, an I2C start condition may be provided between sequences of symbols transmitted on the two-wire serial bus in the CCIe mode of operation. Certain aspects of the timing of the start condition may cause a reset of receive logic in another device configured for I2C modes of operation, including devices that can only communicate using I2C protocols.

In one example, a first I2C start condition is transmitted on the two-wire serial bus before the sequence of symbols is transmitted on the two-wire serial bus. After the sequence of symbols has been transmitted on the two-wire serial bus, a second I2C start condition may be transmitted on the two-wire serial bus. The time elapsed between the first and second I2C start conditions may be less the time required by I2C protocols to receive an address word in I2C modes of operation. Accordingly, an I2C receiver monitoring the two-wire serial bus typically perceives a maximum of 6 clock cycles on an SCL signal wire of the two-wire serial bus after the first start condition and before the second I2C start condition.

Figure 23:
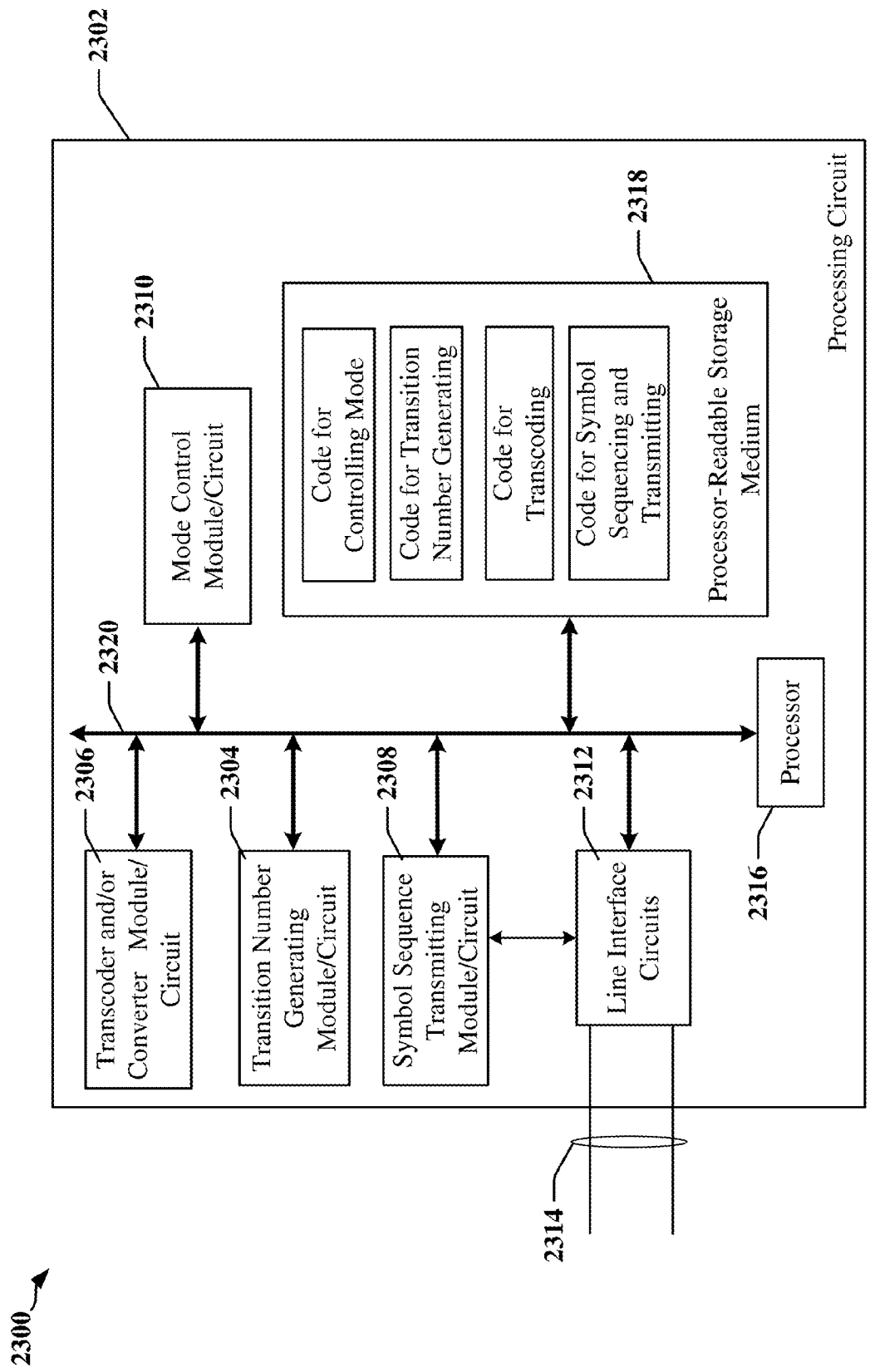
FIG. 23 is a diagram illustrating an example of a hardware implementation for a transmitting apparatus that communicates information on a CCIe bus according to one or more aspects disclosed herein.

FIG. 23 is a diagram illustrating a simplified example of a hardware implementation for an apparatus 2300 employing a processing circuit 2302. The processing circuit typically has a processor 2316 that may include one or more of a microprocessor, microcontroller, digital signal processor, a sequencer, a state machine, or the like. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the processor 2316, the modules or circuits 2304, 2306, 2308 and 2310, line interface circuits 2312 configurable to communicate over a multi-lane CCIe bus 2314 that includes a plurality of connectors or wires, and the computer-readable storage medium 2318. The bus 2320 may also link various other circuits such as timing sources, peripherals, voltage regulators, and power management circuits, which are well known in the art, and therefore, will not be described any further.

The processor 2316 is responsible for general processing, including the execution of software stored on the computer-readable storage medium 2318. The software, when executed by the processor 2316, causes the processing circuit 2302 to perform the various functions described supra for any particular apparatus. The computer-readable storage medium 2318 may also be used for storing data that is manipulated by the processor 2316 when executing software, including data decoded from symbols transmitted over the multi-lane CCIe bus 2314. The processing circuit 2302 further includes at least one of the modules and/or circuits 2304, 2306 and 2308. The modules and/or circuits 2304, 2306, 2308 and 2310 may be software modules loaded, configured and running in the processor 2316, resident/stored in the computer-readable storage medium 2318, one or more hardware modules coupled to the processor 2316, or some combination thereof. The modules and/or circuits 2304, 2306 and 2308 may include microcontroller instructions, state machine configuration parameters, or some combination thereof.

In one configuration, the apparatus 2300 for wireless communication includes a module and/or circuit 2304 that is configured to generate a transition number from a set of bits, a module and/or circuit 2306 that is configured to convert the transition number into a sequence of symbols, and a module and/or circuit 2308 that is configured to transmit the sequence of symbols in the signaling state of a two-wire serial bus. The apparatus 2300 may include additional module and/or circuits including, for example, a module and/or circuit 2310 that controls the mode of operation of the serial bus 2314 and/or the apparatus 2300. For example, the mode control module and/or circuit 2310 may include or cooperate with a command generation module that transmits control sequences on the serial bus 2314. In another example, the mode control module and/or circuit 2310 may cause a reconfiguration of the line interface circuits 2312 to enable open-drain line drivers or equivalents thereof in an I2C mode of operation and push-pull drivers in a CCIe mode of operation.

Figure 24:
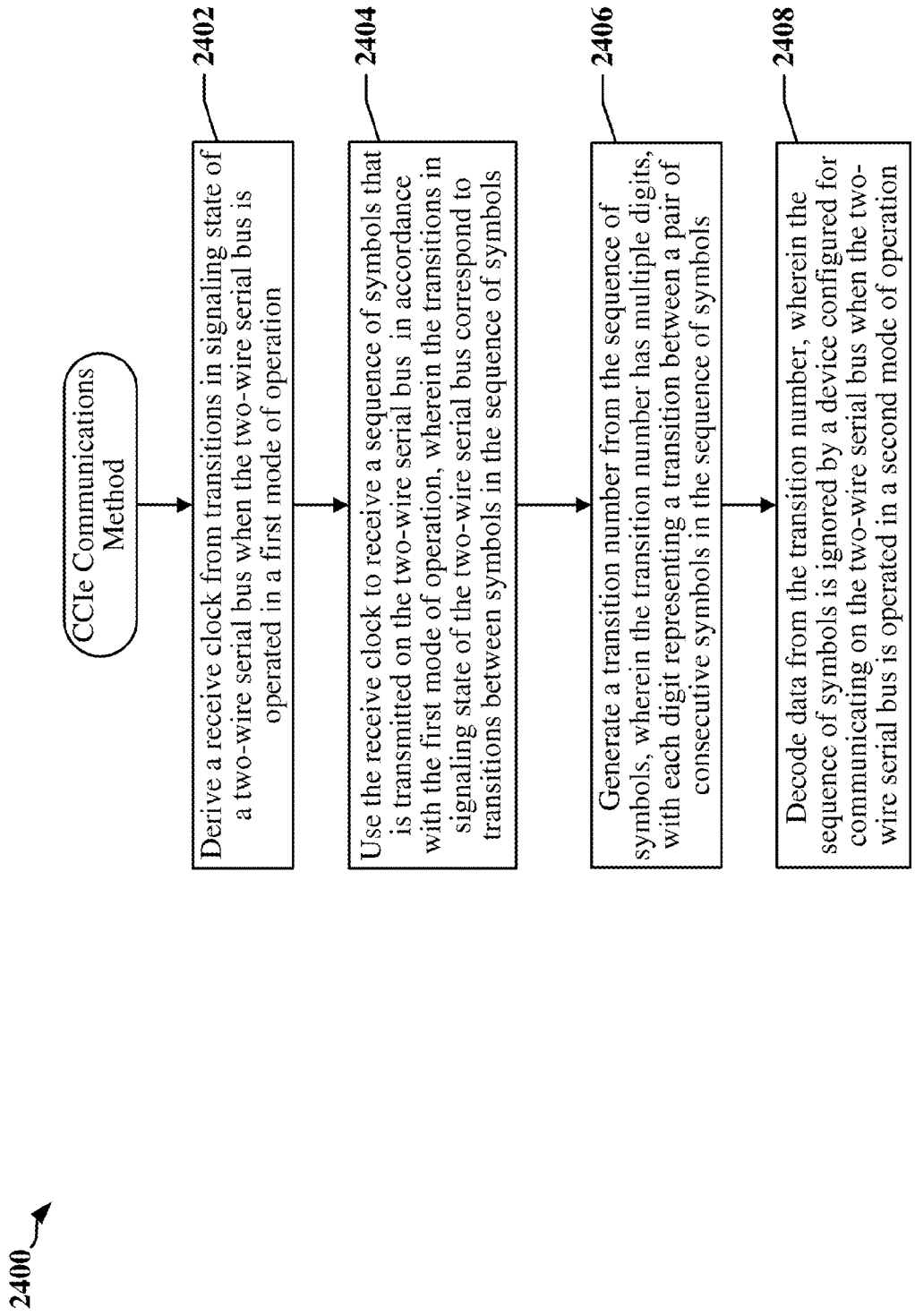
FIG. 24 is a flow chart of a method for receiving information from a CCIe bus according to one or more aspects disclosed herein.

FIG. 24 is a flowchart 2400 illustrating a method for data communications on a CCIe bus. Various steps of the method may be performed using receiver circuitry and modules in a CCIe device that includes some combination of the devices and circuits illustrated in FIGS. 1-8, 20, 23 and/or 24, for example.

At step 2402, the device may derive a receive clock from transitions in signaling state of a two-wire serial bus when the two-wire serial bus is operated in a first mode of operation. The two-wire serial bus may be a multi-purpose bus that concurrently supports CCIe communications when the two-wire serial bus is operated in the first mode of operation. The two-wire serial bus may support I2C communications in the second mode of operation. The two-wire serial bus may support communications with devices compatible with one or more of I2C, CCI and/or CCIe protocols.

At step 2404, the device may use the receive clock to receive a sequence of symbols that is transmitted on the two-wire serial bus in accordance with the first mode of operation. Transitions in a signaling state of the two-wire serial bus may correspond to transitions between symbols in the sequence of symbols. The sequence of symbols may be received from the two-wire serial bus by determining an I2C start condition on the two-wire serial bus, and receiving 12 symbols from the two-wire serial bus according to timing defined by the receive clock.

In one aspect, the sequence of symbols may be ignored by a device configured for communicating on the two-wire serial bus when the two-wire serial bus is operated in a second mode of operation.

At step 2406, the device may generate a transition number from the sequence of symbols. The transition number may have multiple digits, with each digit representing a transition between a pair of consecutive symbols in the sequence of symbols.

At step 2408, the device may decode data from the transition number. The transition number may be a twelve-digit ternary number. Four (4) signaling states may be defined for the two-wire serial bus. Each digit of the ternary number may represent a relationship between a pair of consecutive signaling states on the two-wire serial bus. Each symbol in the sequence of symbols may be one of four symbols defined by the signaling state of the two-wire serial bus. Each digit of the ternary number may define a relationship between a pair of consecutive symbols in the sequence of symbols.

Figure 25:
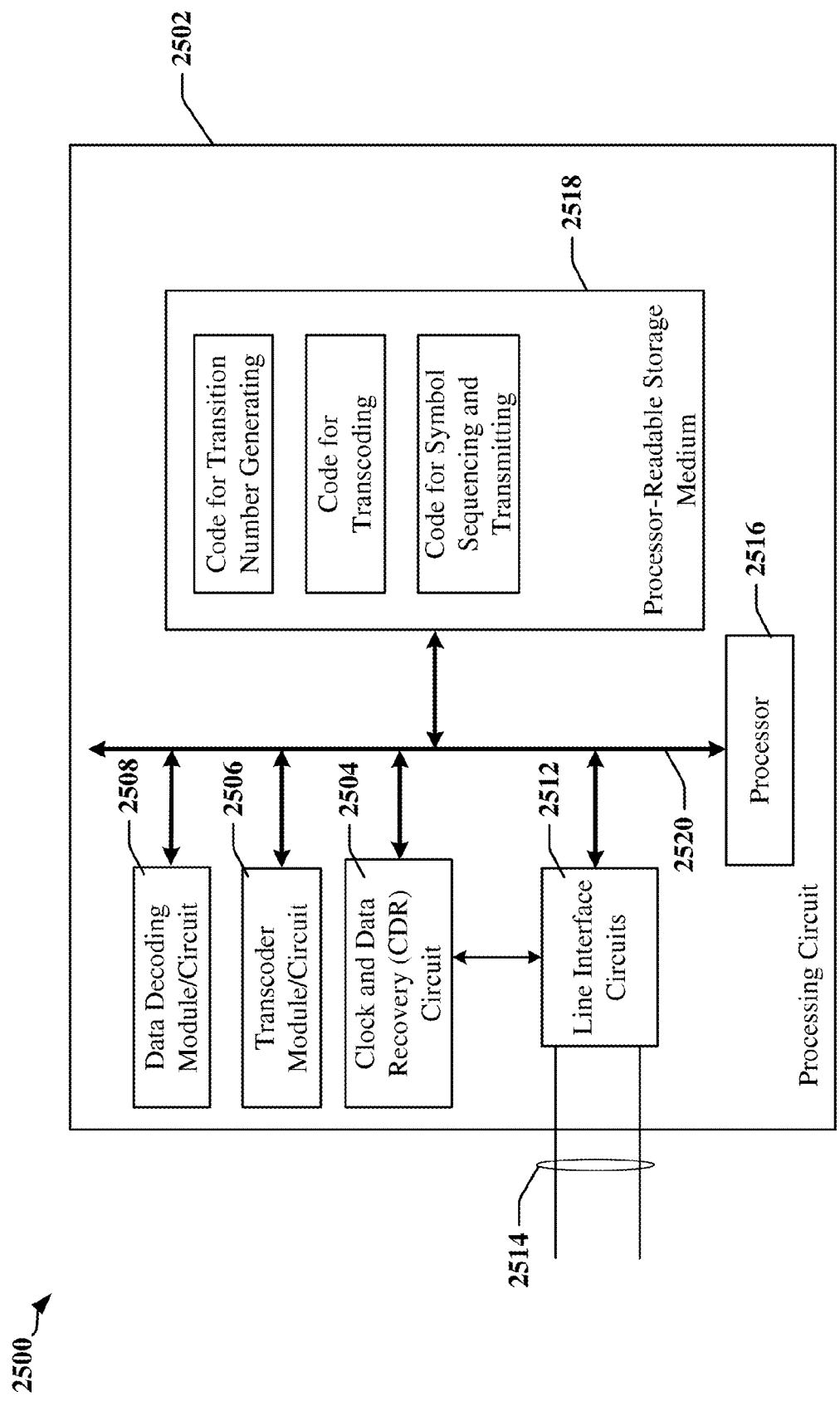
FIG. 25 is a diagram illustrating an example of a hardware implementation for a receiving apparatus that decodes information transmitted on a CCIe bus according to one or more aspects disclosed herein.

FIG. 25 is a diagram illustrating a simplified example of a hardware implementation for an apparatus 2500 employing a processing circuit 2502. The processing circuit typically has a processor 2516 that may include one or more of a microprocessor, microcontroller, digital signal processor, a sequencer, a state machine, or the like. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the processor 2516, the modules and/or circuits 2504, 2506 and 2508, line interface circuits 2512 configurable to communicate over a multi-lane CCIe bus 2514 that includes a plurality of connectors or wires, and the computer-readable storage medium 2518. The bus 2520 may also link various other circuits such as timing sources, peripherals, voltage regulators, and power management circuits, which are well known in the art, and therefore, will not be described any further.

The processor 2516 is responsible for general processing, including the execution of software stored on the computer-readable storage medium 2518. The software, when executed by the processor 2516, causes the processing circuit 2502 to perform the various functions described supra for any particular apparatus. The computer-readable storage medium 2518 may also be used for storing data that is manipulated by the processor 2516 when executing software, including data decoded from symbols transmitted over the multi-lane CCIe bus 2514. The processing circuit 2502 further includes at least one of the modules and/or circuits 2504, 2506 and 2508. The modules and/or circuits 2504, 2506 and 2508 may be software modules running in the processor 2516, resident/stored in the computer-readable storage medium 2518, one or more hardware modules coupled to the processor 2516, or some combination thereof. The modules and/or circuits 2504, 2506 and 2508 may include microcontroller instructions, state machine configuration parameters, or some combination thereof.

In one configuration, the apparatus 2500 for wireless communication includes a CDR circuit 2504 that is configured to derive a receive clock from transitions in signaling state of a two-wire serial bus and to receive a sequence of symbols from the two-wire serial bus using the receive clock, a module and/or circuit 2506 that is configured to generate a transition number from the sequence of symbols, and a module and/or circuit 2508 that is configured to decode data from the transition number. The transitions in the signaling state of the two-wire serial bus may correspond to transitions between symbols in the sequence of symbols. The transition number may have multiple digits, with each digit representing a transition between a pair of consecutive symbols in the sequence of symbols.

Figure 26:
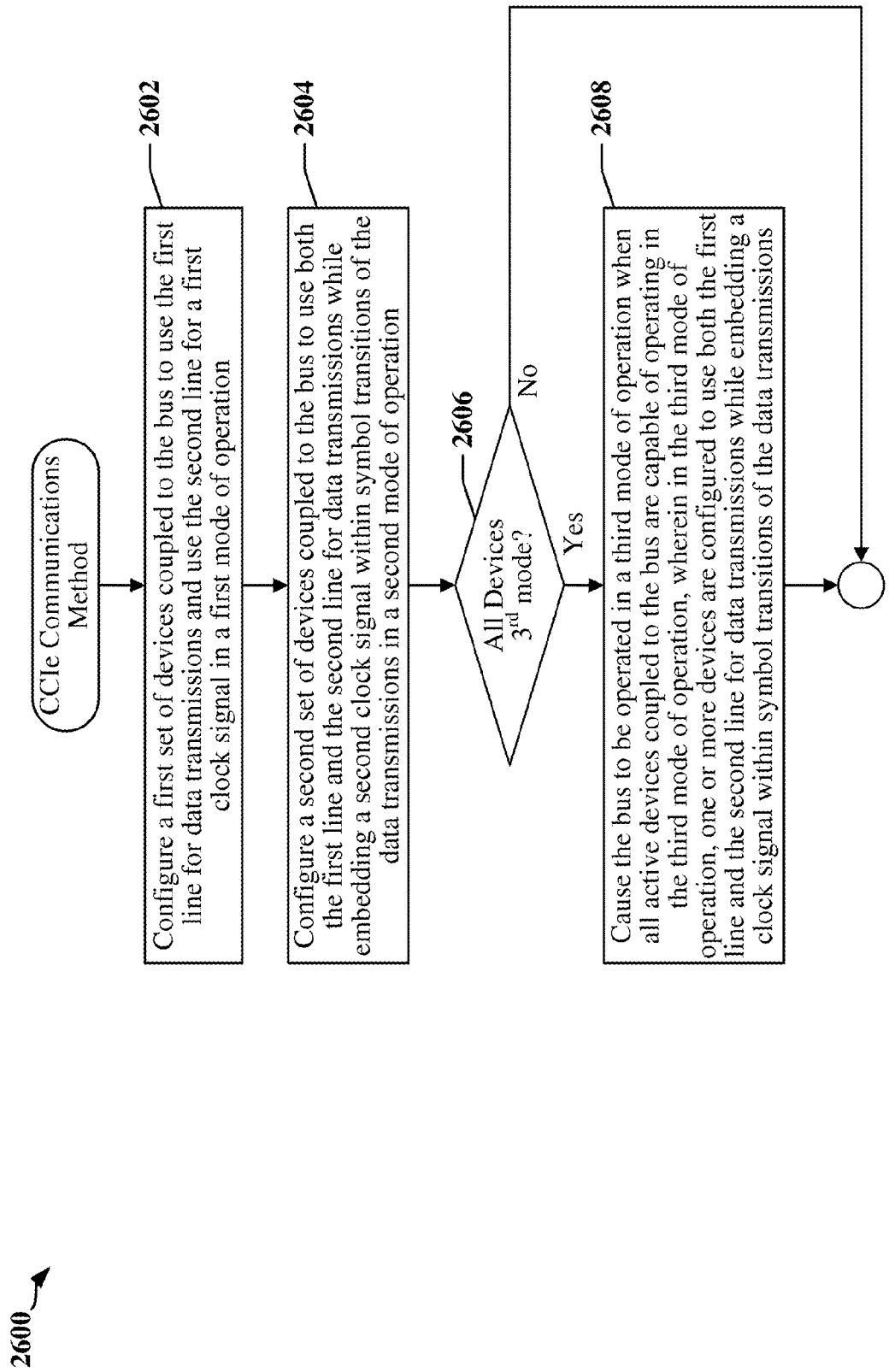
FIG. 26 is a flow chart of a method of operating a system or device that employs a bus according to one or more aspects disclosed herein.

FIG. 26 is a flowchart 2600 illustrating a method related to a system or device that employs a bus. In one example, a device may have a bus including a first line and a second line, a first set of devices coupled to the bus and a second set of devices coupled to the bus. The method may be applicable to a CCIe bus 430 as disclosed herein, whereby the first line may be the SDA line 418 and the second line may be the SCL line 416 (see FIGS. 4 and 17, for example).

At step 2602, the first set of devices coupled to the bus may be configured to use the first line for data transmissions and use the second line for a first clock signal in a first mode of operation.

At step 2604, the second set of devices coupled to the bus may be configured to use both the first line and the second line for data transmissions while embedding a second clock signal within symbol transitions of the data transmissions in a second mode of operation.

In some instances, the bus may be operable in a third mode. In such instances, it may be determined at step 2606 whether all active devices coupled to the bus are capable of operating in the third mode. In one example, the determination is made based on configuration information maintained by a bus master device. The configuration information may include predefined configuration information and/or information obtained by a discovery protocol, or the like. The configuration information may include descriptions of the capabilities of devices coupled to the bus that have been identified as currently active. A currently active device may be a device that has been identified in a start-up procedure, a device that has responded to a broadcast transmitted on the bus, and/or a device that has been engaged in a communication transaction on the bus. An inactive device may be a dormant device and/or a device that has not responded to a communication transmitted on the bus that included the device's SID, or that included a broadcast that would be expected to a prompt a response from the device.

If it is determined at step 2606 that all active devices coupled to the bus are capable of operating in the third mode of operation, then at step 2608 the bus may be caused to operate in a third mode of operation. In the third mode of operation, one or more devices are configured to use both the first line and the second line for data transmissions while embedding a clock signal within symbol transitions of the data transmissions.

In some instances, the first set of devices and second set of devices concurrently monitor at least one line of the bus in both the first mode and second mode of operation. A master device in the first set of devices may transmit data over the first line of the bus to a slave device in the first set of devices in the first mode of operation. A master device in the second set of devices may transmit data over the bus to a slave device in the second set of devices in the second mode of operation. Devices in the second set of devices are capable of operating in both the first mode of operation and the second mode of operation. A master device may be capable of operating in the first and second modes of operation. A device may serve as a master device in both the first and second modes of operation. A device that can serve as a master device in both the first and second modes of operation may be considered to a member of both the first and second sets of devices. A master device may be capable of operating in the first, second and third modes of operation. A device may serve as a master device in each of the first, second and third modes of operation.

In one aspect, the first mode of operation implements a first protocol for data transmissions over the bus and the second mode implements a second protocol for data transmissions over the bus. The first protocol may correspond to, or be compatible with an I2C mode of operation. The second protocol may correspond to, or be compatible with a CCIe mode of operation.

The first set of devices may receive a reset indicator over the first line and second line inhibiting detection of a valid slave node address in the second mode of operation. In one example, data transmissions in the second mode of operation are periodically interrupted by inserting a reset indicator in the first line and second line that causes the first set of devices to reset their bus logic prior to detecting a valid sequence of bits. The reset indicator may correspond to a Start condition when the first mode of operation corresponds to, or is compatible with an I2C mode of operation.

According to certain aspects disclosed herein, a master node in the second set of devices sends a first bit sequence over the first line during the first mode of operation, where the first bit sequence indicates a switch to the second mode of operation to the second set of devices. During the second mode of operation, a master node may send an exit symbol sequence over the bus indicating to the second set of devices indicating a switch to the first mode of operation.

According to certain aspects disclosed herein, the bus is an I2C-compatible bus. In one example, the first mode of operation may have a maximum bit rate of 1 megabits per second over the bus and the second mode of operation may have a maximum bit rate of 6.4 megabits per second. In another example, the first mode of operation has a maximum bit rate of 1 megabits per second over the bus and the second mode of operation has a maximum bit rate of 16.7 megabits per second.

In some instances, the first mode of operation implements a first protocol for data transmissions over the bus, the second mode of operation implements a second protocol for data transmissions over the bus, and the third mode of operation implements a third protocol for data transmissions over the bus. The third mode of operation may have a maximum bit rate of 27.1 megabits per second over the bus.

In one example, the bus is coupled to a first device in the second set of devices that includes a baseband processor, and to a second device in the second set of devices that includes an image sensor. The bus may carry control data signals between the baseband processor and image sensor.

According to certain aspects disclosed herein, each device in the second set of devices may be adapted to convert a sequence of data bits into a plurality of M transition numbers, convert each transition number into a sequential number from a set of sequential numbers, and transmit the sequential number over the bus. The sequential number may be selected from the transition number based on a transition from an immediately previous sequential number to guarantee that no two sequential numbers are the same. Each transition number may be converted into a sequential number from a set of sequential numbers by converting a plurality of transition numbers into a sequential number.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication comprising:
    generating, at a first device, a transition number from a set of bits;
    converting, at the first device, the transition number into a sequence of symbols, wherein timing information is encoded in transitions between symbols in the sequence of symbols; and
    transmitting, from the first device, the sequence of symbols on a two-wire serial bus when the two-wire serial bus is operated in a first mode of operation, wherein each transition between consecutive symbols causes a change in a signaling state of the two-wire serial bus,
    wherein, while the two-wire serial bus is in the first mode of operation, the sequence of symbols is ignored by a second device coupled to the two-wire serial bus, and
    wherein the second device is configured for communicating on the two-wire serial bus using a second mode of operation of the two-wire serial bus.

2. The method of claim 1, wherein the transition number comprises a twelve digit ternary number.

3. The method of claim 1, wherein converting the transition number into the sequence of symbols comprises:
    converting the set of bits to a ternary transition number; and
    providing the ternary transition number to a transcoder, wherein a most significant digit of the ternary transition number is provided to the transcoder first, a least significant digit of the ternary transition number is provided to the transcoder last, and intermediate digits between the most significant digit and the least significant digit are provided to the transcoder in order of decreasing significance.

4. The method of claim 1, wherein converting the transition number into the sequence of symbols comprises:
    converting the set of bits to a ternary transition number; and
    providing the ternary transition number to a transcoder, wherein a most significant digit of the ternary transition number is provided to the transcoder last.

5. The method of claim 1, wherein four signaling states are defined for the two-wire serial bus, and wherein each digit of the transition number selects a next symbol to be transmitted on the two-wire serial bus from one of three available symbols, each of the three available symbols being different from a current symbol being transmitted on the two-wire serial bus.

6. The method of claim 1, wherein timing information encoded in the sequence of symbols enables a receiver to generate a receive clock from the sequence of symbols.

7. The method of claim 1, wherein the two-wire serial bus is a multi-purpose bus that supports communications using camera control interface extension (CCIe) protocols when the two-wire serial bus is operated in the first mode of operation, and wherein the two-wire serial bus supports communications using Inter-Integrated Circuit (I2C) protocols in the second mode of operation.

8. The method of claim 7, wherein transmitting the sequence of symbols on the two-wire serial bus comprises:
providing an I2C start condition between sequences of symbols transmitted on the two-wire serial bus in the first mode of operation,
wherein timing of the start condition causes a reset of receive logic in a device configured for communications using the I2C protocols.

9. The method of claim 7, wherein transmitting the sequence of symbols on the two-wire serial bus comprises:
transmitting a first I2C start condition on the two-wire serial bus;
transmitting the sequence of symbols on the two-wire serial bus after the first I2C start condition is transmitted; and
transmitting a second I2C start condition on the two-wire serial bus,
wherein an I2C receiver monitoring the two-wire serial bus perceives a maximum of 6 clock cycles on a Serial Clock Line (SCL) of the two-wire serial bus after the first start condition and before the second I2C start condition.

10. The method of claim 1, further comprising:
changing from the first mode of operation to the second mode of operation after a control sequence is transmitted on the two-wire serial bus.

11. An apparatus comprising:
a first device including:
a bus interface adapted to couple the apparatus to a two-wire serial bus operable to be shared with a plurality of other devices; and
a processing circuit coupled to the bus interface, the processing circuit configured to:
generate a transition number from a set of bits;
convert the transition number into a sequence of symbols, wherein timing information is encoded in transitions between symbols in the sequence of symbols; and
transmit the sequence of symbols on a two-wire serial bus when the two-wire serial bus is operated in a first mode of operation, wherein each transition between consecutive symbols causes a change in a signaling state of the two-wire serial bus,
wherein, while the two-wire serial bus is in the first mode of operation, the sequence of symbols is ignored by a second device coupled to the two-wire serial bus, and
wherein the second device is configured for communicating on the two-wire serial bus using a second mode of operation of the two-wire serial bus.

12. The apparatus of claim 11, wherein the transition number comprises a twelve digit ternary number.

13. The apparatus of claim 12, wherein the processing circuit is configured to convert the transition number into the sequence of symbols by:
converting the set of bits to a ternary transition number; and
providing the ternary transition number to a transcoder, wherein a most significant digit of the ternary transition number is provided to the transcoder first, a least significant digit of the ternary transition number is provided to the transcoder last, and intermediate digits between the most significant digit and the least significant digit are provided to the transcoder in order of decreasing significance.

14. The apparatus of claim 12, wherein the processing circuit is configured to convert the transition number into the sequence of symbols by:
converting the set of bits to a ternary transition number; and
providing the ternary transition number to a transcoder, wherein a most significant digit of the ternary transition number is provided to the transcoder last.

15. The apparatus of claim 12, wherein four signaling states are defined for the two-wire serial bus, and wherein each digit of the ternary number selects a next symbol to be transmitted on the two-wire serial bus from one of three available symbols, each of the three available symbols being different from a current symbol being transmitted on the two-wire serial bus.

16. The apparatus of claim 11, wherein timing information encoded in the sequence of symbols enables a receiver to generate a receive clock from the sequence of symbols.

17. The apparatus of claim 11, wherein the two-wire serial bus is a multi-purpose bus that supports communications using camera control interface extension (CCIe) protocols when the two-wire serial bus is operated in the first mode of operation, and wherein the two-wire serial bus supports communications using Inter-Integrated Circuit (I2C) protocols in the second mode of operation.

18. The apparatus of claim 17, wherein the processing circuit is configured to transmit the sequence of symbols on the two-wire serial bus by providing an I2C start condition between sequences of symbols transmitted on the two-wire serial bus in the first mode of operation, wherein timing of the start condition causes a reset of receive logic in a device configured for communications using the I2C protocols.

19. The apparatus of claim 17, wherein the processing circuit is configured to transmit the sequence of symbols on the two-wire serial bus by:
transmitting a first I2C start condition on the two-wire serial bus;
transmitting the sequence of symbols on the two-wire serial bus after the first I2C start condition is transmitted; and
transmitting a second I2C start condition on the two-wire serial bus,
wherein an I2C receiver monitoring the two-wire serial bus perceives a maximum of 6 clock cycles on a Serial Clock Line (SCL) of the two-wire serial bus after the first start condition and before the second I2C start condition.

20. The apparatus of claim 11, wherein the processing circuit is configured to:
change from the first mode of operation to the second mode of operation after a control sequence is transmitted on the two-wire serial bus.

21. A method of data communication comprising:
deriving at a first device, a receive clock from transitions in signaling state of a two-wire serial bus when the two-wire serial bus is operated in a first mode of operation;
using the receive clock at the first device to receive a sequence of symbols that is transmitted on the two-wire serial bus in accordance with the first mode of operation, wherein the transitions in signaling state of the two-wire serial bus correspond to transitions between symbols in the sequence of symbols;

generating, at the first device, a transition number from the sequence of symbols, wherein the transition number has multiple digits, with each digit representing a transition between a pair of consecutive symbols in the sequence of symbols; and decoding, at the first device, data from the transition number, wherein, while the two-wire serial bus is in the first mode of operation, the sequence of symbols is ignored by a second device coupled to the two-wire serial bus, and wherein the second device is configured for communicating on the two-wire serial bus using a second mode of operation of the two-wire serial bus.

22. The method of claim 21, wherein the transition number comprises a twelve digit ternary number.

23. The method of claim 22, wherein four signaling states are defined for the two-wire serial bus, and wherein each digit of the ternary number represents a relationship between a pair of consecutive signaling states on the two-wire serial bus.

24. The method of claim 22, wherein each symbol in the sequence of symbols is one of four symbols defined by the signaling state of the two-wire serial bus, and wherein each digit of the ternary number defines a relationship between a pair of consecutive symbols in the sequence of symbols.

25. The method of claim 21, wherein the two-wire serial bus is a multi-purpose bus that supports camera control interface extension (CCIe) communications when the two-wire serial bus is operated in the first mode of operation, and wherein the two-wire serial bus supports Inter-Integrated Circuit (I2C) communications in the second mode of operation, and wherein receiving the sequence of symbols from the two-wire serial bus comprises:

determining an I2C start condition on the two-wire serial bus; and receiving the sequence of symbols from the two-wire serial bus according to timing defined by the receive clock.

26. An apparatus comprising
a first device including:
a bus interface adapted to couple the apparatus to a two-wire serial bus operable to be shared with a plurality of other devices;

a clock recovery circuit configured to derive a receive clock from transitions in signaling state of a two-wire serial bus; and a processing circuit coupled to the bus interface, the processing circuit configured to:

use the receive clock to receive a sequence of symbols that is transmitted on the two-wire serial bus in accordance with a first mode of operation, wherein the transitions in signaling state of the two-wire serial bus correspond to transitions between symbols in the sequence of symbols;

generate a transition number from the sequence of symbols, wherein the transition number has multiple digits, with each digit representing a transition between a pair of consecutive symbols in the sequence of symbols; and decode data from the transition number, wherein, while the two-wire serial bus is in the first mode of operation, the sequence of symbols is ignored by a second device coupled to the two-wire serial bus, and wherein the second device is configured for communicating on the two-wire serial bus using a second mode of operation of the two-wire serial bus.

27. The apparatus of claim 26, wherein the transition number comprises a twelve digit ternary number.

28. The apparatus of claim 27, wherein four signaling states are defined for the two-wire serial bus, and wherein each digit of the ternary number represents a relationship between a pair of consecutive signaling states on the two-wire serial bus.

29. The apparatus of claim 27, wherein each symbol in the sequence of symbols is one of four symbols defined by the signaling state of the two-wire serial bus, and wherein each digit of the ternary number defines a relationship between a pair of consecutive symbols in the sequence of symbols.

30. The apparatus of claim 26, wherein the two-wire serial bus is a multi-purpose bus that supports camera control interface extension (CCIe) communications when the two-wire serial bus is operated in the first mode of operation, and wherein the two-wire serial bus supports Inter-Integrated Circuit (I2C) communications in the second mode of operation, and wherein the sequence of symbols received from the two-wire serial bus comprises at least 12 symbols and is preceded by an I2C start.

* * * * *